United States Patent [19]
Suzuki et al.

[11] Patent Number: 5,272,564
[45] Date of Patent: Dec. 21, 1993

[54] ZOOM LENS OF INTERNAL FOCUSING SYSTEM

[75] Inventors: Kenzaburo Suzuki, Tokyo; Yoshinari Hamanishi, Wako, both of Japan

[73] Assignee: Nikon Corporation, Tokyo, Japan

[21] Appl. No.: 789,010

[22] Filed: Nov. 7, 1991

[30] Foreign Application Priority Data

Nov. 27, 1990 [JP] Japan ................ 2-323760

[51] Int. Cl.$^5$ .......................................... G02B 15/14
[52] U.S. Cl. ............................ 359/676; 359/684; 359/686
[58] Field of Search ............ 359/676, 677, 683–686, 359/691–693, 793–797

[56] References Cited

U.S. PATENT DOCUMENTS

| | | | |
|---|---|---|---|
| 3,598,476 | 8/1971 | Hengold | 359/684 |
| 3,796,481 | 3/1974 | Fujii | 359/687 |
| 4,871,240 | 10/1989 | Suda | 359/683 |
| 5,002,373 | 3/1991 | Yamanashi | 359/684 |
| 5,059,007 | 10/1991 | Tanaka | 359/684 |

FOREIGN PATENT DOCUMENTS

| | | | |
|---|---|---|---|
| 58-137812 | 8/1983 | Japan | 359/684 |
| 3-259209 | 11/1991 | Japan | 359/676 |

Primary Examiner—Scott J. Sugarman
Assistant Examiner—Thong Nguyen
Attorney, Agent, or Firm—Shapiro and Shapiro

[57] ABSTRACT

Disclosed is a zoom lens of an internal focusing system, comprising: a positive focusing lens group positioned close to an object and incorporating a focusing function; and a zoom variable power optical system including a negative variable power lens group disposed towards an image of the focusing lens group and having such a variable power function as to be movable along an optical axis. The focusing lens group includes, sequentially from an object, a first lens element having a positive refractive power, a second lens element having a positive refractive power and movable along an optical axis and a third lens element having a negative refractive power. Only the second lens element is moved along the optical axis to change a synthetic focal distance of the focusing lens group, thus effecting focusing.

35 Claims, 9 Drawing Sheets

FIG. I

ZOOM LENS OF INTERNAL FOCUSING SYSTEM

BACKGROUND OF THE INVENTION

1. Field of the Invention

The present invention is directed generally to a zoom lens, and more particularly, to a zoom lens of an internal focalizing system for focusing by moving a part of an internal optical system.

2. Related Background Art

A dominant prior art focalizing system of a zoom lens is a so-called front lens focusing system in which a lens closest to an object is moved.

This front lens focusing system has such an advantage that photographing can be effected without causing a defocus even when executing a variable power operation in a state where a desired subject is focalized, because a moving quantity for focusing is invariable even by varying a magnifying power of the lens.

However, an entire length of the zoom lens is changed during focusing, and besides, the closest-to-object lens which is heavy and has a large effective diameter is moved. Therefore, a position of the center of gravity of the zoom lens changes, so that operability of the zoom lens is deteriorated. For this reason, quick focusing is difficult. Besides, particularly in a camera incorporating an auto-focusing (AF) device, a load exerted on a driving source for focusing increases. A respondency of auto-focusing remarkably declines. There also arises a problem in which the driving source for focusing increases in size to cope with this.

The following is an additional problem. Fluctuations in aberration on the occasion of focusing are relatively large when seeing the front lens focusing system in terms of an aberration of the lens. Especially, fluctuations in spherical aberration and in astigmatism tend to be large.

SUMMARY OF THE INVENTION

It is a primary object of the present invention, which has been devised in the light of the foregoing problems, to provide a zoom lens adopting a so-called internal focusing system where an entire lens length is invariable in the case of focusing and also exhibiting an excellent image forming performance from the infinity to the closest distance under conditions of respective magnifications.

To accomplish the above-mentioned object, according to one aspect of the present invention, there is provided a zoom lens comprising at least; a focusing lens group disposed closest to an object and incorporating a focusing function; and a variable power lens group disposed closer to an image than the focusing lens group and incorporating such a variable power function as to be movable along an optical axis for a variable power operation, characterized in that: the focusing lens group includes, sequentially from the object, a first lens element having a positive refractive power, a second lens element having the positive refractive power and a third lens element having a negative refractive power; the second positive lens element interposed between the first lens element and the third negative lens element is moved along the optical axis during focusing; a position of a principal point of the focusing lens group is thereby moved; and simultaneously a synthetic focal distance is varied.

In the zoom lens according to the present invention which is constructed by incorporating the above-described novel focusing system thereinto, the optical system is compact, and quick focusing is attainable. Further, a variety of aberrations are extremely well compensated from the infinity to the closest distance in all variable power areas extending from a wide angle end to a telephoto end. An excellent image forming performance is thereby exhibited.

Incidentally, it is desirable that the focusing lens group be constructed to satisfy the following conditions for obtaining the foregoing effects more effectively:

$$1 \leq f12/f1 \leq 5$$
$$-5 \leq f13/f1 \leq -1.6$$
$$0.3 \leq f11/f12 \leq 1$$

where f1: the focal distance of the focusing lens group in the infinity focusing state;

f11: the focal distance of the first lens element;

f12: the focal distance of the second lens element; and f13: the focal distance of the third lens element.

Other objects, characteristics and effects of the present invention will become sufficiently apparent during the following detailed discussion taken in conjunction with the accompanying drawings.

DESCRIPTION OF THE PREFERRED EMBODIMENTS

Embodiments of the present invention will hereinafter be described in detail with reference to the accompanying drawings.

FIGS. 1 through 9 are block diagrams of optical systems, respectively showing first through ninth embodiments according to the present invention. Each embodiment fundamentally has the same lens structure as a zoom lens of the first embodiment of this invention. To be specific, the zoom lens in each embodiment includes, sequentially from the side of an object, a first lens group G1 (focusing lens group) having a focusing function and a positive refractive power, a second lens group G2 (variable power lens group) having a variable power function and a negative refractive power, a third lens group G3 (image surface position compensating lens group) having a positive refractive power and a function to compensate an image surface position which fluctuates depending on a variable power by this second lens group G2, and a fourth lens group G4 (image forming lens group) having an image forming function and a positive refractive power. The first lens group G1 defined as the focusing lens group incorporates, sequentially from the object side, a first fixed lens element G11 having a positive refractive power, a second movable lens element G12 having a focusing function and a positive refractive power, and a third fixed lens element G13 having a negative refractive power.

Figure 1:
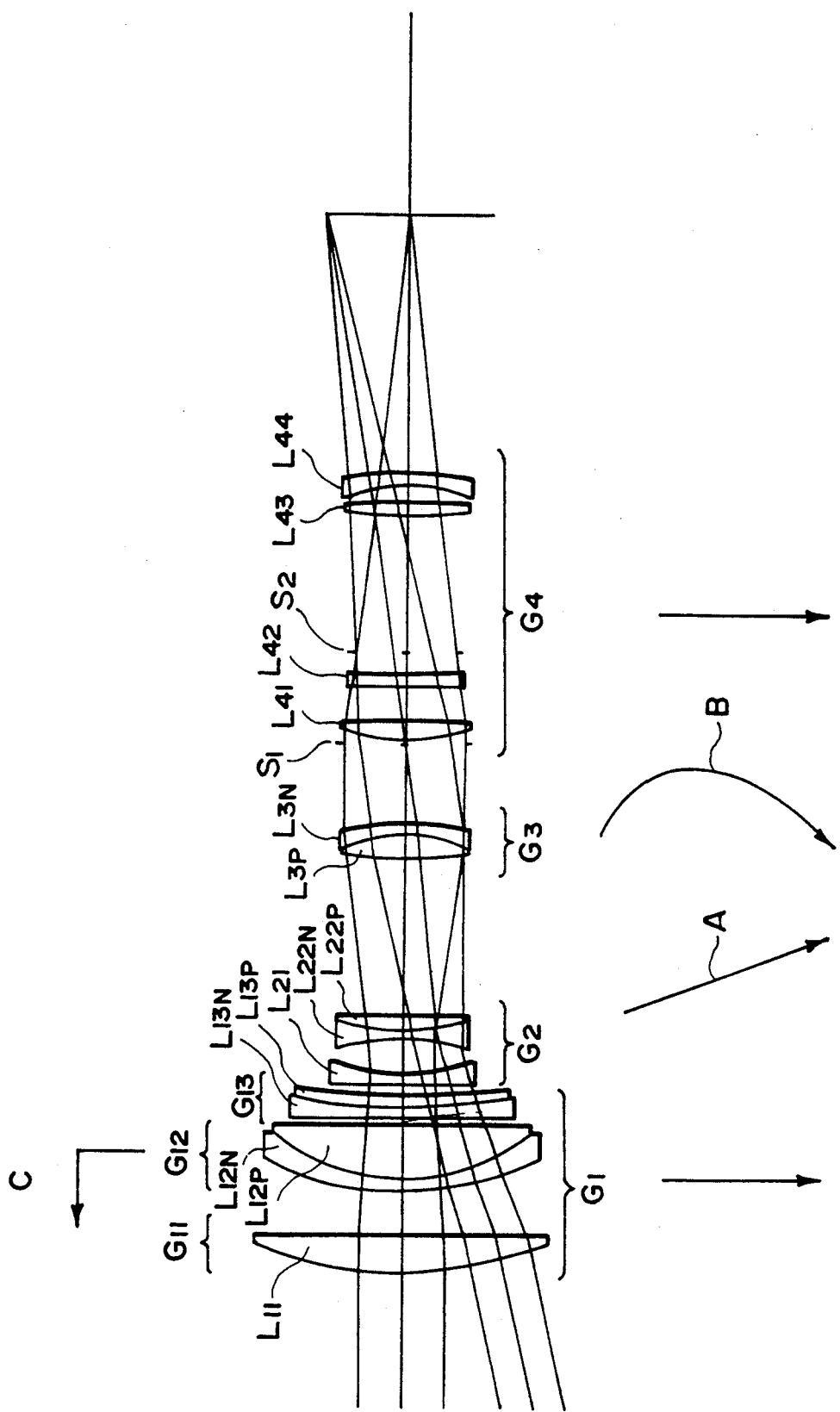
FIG. 1 is a block diagram of an optical system, illustrating a lens placement and a light path in a first embodiment of the present invention.

Based on such a structure, in each embodiment, during a variable power operation from a wide-angle end to a telephoto end, the second lens group G2 defined as the variable power group moves towards an image while depicting, as indicated by an arrowhead A in FIG. 1, a rectilinear trajectory. Simultaneously, the third lens group G3 defined as the image surface compensating group moves towards the image while depicting, as indicated by an arrowhead B in FIG. 1, a convex (U-turn) trajectory. In accordance with each embodiment, during focusing from the infinity to the closest distance in each magnifying power state, as depicted by an arrowhead C in FIG. 1, the second positive lens element G12 incorporated in the first lens group G1 moves to the object.

Note that in the respective embodiments, an aperture diaphragm S1 is disposed on the object side of the fourth lens group G4, while a fixed diaphragm S2 is disposed inwardly of the fourth lens group.

The zoom lens according to the present invention includes at least the focusing lens group (first lens group) G1 disposed, as discussed above, closest to the object and incorporating the focusing function and a variable power lens group G2 disposed closer to the image than this focusing lens group G1 and incorporating the variable power function. The focusing lens group G1 includes, sequentially from the object, the first lens element G11 having the positive refractive power, the second lens element G12 similarly having the positive refractive power and the third lens element G13 having the negative refractive power. Adopted is a novel internal focusing system in which when effecting focusing, only the second lens element G12 interposed between the first lens element G11 and the third lens element G13 moves along an optical axis.

A principle of this internal focusing system according to the present invention will be explained in detail.

The whole focusing lens group is moved along the optical axis. To effect focusing not depending on a so-called front lens moving system but by means of the focusing lens group, it is required that some lenses within the focusing lens group be moved to change a synthetic focal distance of the whole focusing lens group.

It is now assumed that the focusing lens group is composed of the first positive lens element G11 and the second positive movable lens element G12. In this case, a relation of the following formula (a) is established:

$$\frac{1}{f1} = \frac{1}{f11} + \frac{1}{f12} - \frac{d1}{f11 \cdot f12} \quad (a)$$

where f11>0, f12>0, f1 is the synthetic focal distance of the whole focusing lens group, f11 is the focal distance of the first positive lens element, f12 is the focal distance of the second positive lens element G12, and d1 is a principal point interval between the first positive lens element G11 and the second positive lens element G12. The focusing lens group is thus composed of the two positive lens elements. In this case, to perform focusing from, e.g., the infinity to the close distance, the synthetic focal distance f1 of the focusing lens group is required to be small. For this purpose, as is comprehensible from the formula (a), it is necessary to reduce the principal point interval between the first positive lens element and the second positive lens element.

On the other hand, the focusing lens group is constructed of, e.g., the second positive lens element G12 and the third negative lens element G13. In this case, a relation of the following formula (b) is established:

$$\frac{1}{f1} = \frac{1}{f12} + \frac{1}{f13} - \frac{d2}{f12 \cdot f13} \quad (b)$$

where f12>0, f13<0, f1 is the synthetic focal distance of the focusing lens group, f12 is the focal distance of the second positive lens element, f13 is the focal distance of the third negative lens element G13, and d2 is the principal point interval between the second positive lens element G12 and the third negative lens element G13.

The focusing lens group is thus composed of the two positive/negative elements. In this case also, to effect focusing, as discussed above, it is required that the synthetic focal distance of the whole focusing lens group G1 be decreased. For this purpose, as can be understood from the foregoing formula (b), it is necessary to reduce the principal point interval d2 between the second positive lens element G12 and the third negative lens element G13.

Hence, in the case of focusing from the infinity to the closest distance, the focusing lens group G1 consists of the three positive/positive/negative lens elements G11, G12, G13. While reducing the principal point interval d1 between the first positive lens element G11 and the second positive lens element G12 in conformity with the formula (a), the first positive lens element G11 and the third negative lens element G13 are fixed to increase the principal point interval d2 between the second positive lens element G12 and the third negative lens element G13 in accordance with the formula (b). It is apparently effective that the second positive lens element G12 is moved towards the object in this fixed state.

As described above, the focusing system according to the present invention is a novel internal focusing system of effectively combining two focusing systems in the case where the focusing lens group consists of the first positive lens element and the second positive lens element and in the case where the focusing lens group is constructed of the positive lens element and the negative lens element.

Based on this focusing system, it is possible to attain focusing to a very close distance even with an extremely small moving quantity. For this reason, it is feasible to reduce variations in height at which a principal ray passes through the focusing lens group. Therefore, the lenses of this focusing lens group (first lens group) G1 can be decreased both in effective diameter and in weight. This effect is conspicuous in the second positive lens element G12. An entire length of the zoom lens can be thereby decreased. Further, it is possible to restrain fluctuations in aberration during focusing down to a small degree.

To obtain effects based on the focusing system of this invention more effectively in the zoom lens, it is desirable that the following conditional formulae be satisfied.

| | |
|---|---|
| $1 \leq f12/f1 \leq 5$ | (1) |
| $-5 \leq f13/f1 \leq -1.6$ | (2) |
| $0.3 \leq f11/f12 \leq 1$ | (3) | where f1: the synthetic focal distance of the focusing lens group in an infinity focusing state;

f11: the focal distance of the first positive lens element in the focusing lens group;

f12: the focal distance of the second positive lens element in the focusing lens group; and f13: the focal distance of the third negative lens element in the focusing lens group.

The following is an explanation of the foregoing conditional formulae (1)–(3).

The conditional formula (1) prescribes an optimum refractive power distribution associated with the focusing lens group G1 exhibiting the positive refractive power and the second positive lens element G12 incorporated in this group and moving for focusing. If in excess of an upper limit of the conditional formula (1), the moving quantity of the second positive lens element G12 during focusing becomes too large, resulting in unsuitableness for miniaturization. In addition, because of the large moving quantity of the second positive lens element G12, there are increased variations in height of entering ray (from the optical axis) of each beam passing through the second lens element G12. As a result, the aberration fluctuates, and it is therefore difficult to attain a good image forming performance. Whereas if under a lower limit of the conditional formula (1), the refractive power of the second positive lens group G12 is intensified, and the aberration caused thereby becomes large. In particular, the fluctuations in curvature of an astigmatism/image-surface grow, and a higher aberration is also produced. Hence, no good focusing performance is acquired, and besides, the image forming performance of the whole zoom lens remarkably declines. Incidentally, for achieving a more favorable image forming performance, it is preferable that the upper limit of the conditional formula (1) is set to 2.3, while the lower limit is set to 1.4.

Now, when the focusing lens group G1 is composed of the three positive/positive/negative lens elements, the third negative lens element G13 is only one lens element having the negative refractive power in the focusing lens group G1. In this third negative lens element G13, a positive spherical aberration is produced to offset negative spherical aberrations caused in the first positive lens element G11 and the second positive lens element G12. A spherical aberration caused in the whole focusing lens group G1 can be thereby restrained down to a small degree. This is advantageous arrangement in terms of compensating the aberration.

A value of Petzval sum is large and positive due to the first positive lens element G11 and the second positive lens element G12. However, the Petzval sum as a whole can be reduced with a good balance by the third negative lens element G13 in which a value of Petzval sum exhibiting a tendency opposite thereto becomes negative. The third lens element G13 becomes highly effective in compensating various aberrations as well as in image surface curvature (curvature of field). Furthermore, as discussed above, when performing focusing by moving the second positive lens element G12 along the optical axis, the moving quantity of the second positive lens element G12 with respect to a given object point distance can be reduced with a higher negative refractive power of the third negative lens element G13. The entire length of the lens can be decreased i.e., the miniaturization is attainable.

As described above, the third negative lens element G13 is effective in compensating the aberration as well as in miniaturizing the zoom lens. The conditional formula (2) prescribes a refractive power distribution associated with the focusing lens group G1 having the positive refractive power and the third negative lens element G13 incorporated in this focusing lens group G1.

If in excess of an upper limit of the conditional formula (2), the refractive power of the third negative lens element G13 becomes excessive. An aberration balance is therefore lost, and besides, the principal point of the focusing lens group G1 shifts to the object. Hence, an aerial spacing between the focusing lens group G1 and the second lens group G2 serving as a variable power group is narrowed, resulting in difficulty to obtain a desired variable power ratio. If under a lower limit of the conditional formula (2), as described above, there are diminished the action to cause a positive spherical aberration in the third negative lens element G13 and the action to generate negative Petzval sum. The aberration balance is lost, and it is therefore difficult to compensate a variety of aberrations. Weakened also is the effect to reduce the moving quantity of the second lens element G12 with respect to a constant object point distance. This unfavorably brings about a scale-up of the lens system. Note that the lower limit value of the conditional formula (2) is set more preferably to $-3.2$ for attaining more favorable image forming performance.

The conditional formula (3) prescribes optimum refractive power distributions of the first positive lens element G11 and the second positive lens element G12 among the lens elements constituting the focusing lens group G1 exhibiting the positive refractive power.

Generally, the following is well known from the aberration theory. When the lenses having two positive refractive powers are combined into the lenses having one equal positive refractive power, and if the positive refractive powers are allocated substantially equally to the two lenses, the spherical aberration generated can be minimized. Besides, a degree of freedom in compensating the various aberrations also increases. For this reason, a value of f11/f12 is desirably 1 or thereabouts.

However, when the second positive lens element G12 moves on the optical axis for focusing, a height and an incident angle to the optical axis of each beam passing through the second lens element G12 fluctuate. A magnifying power of image formation by the second positive lens element G12 also fluctuates. For this reason, the good image forming performance from the infinity to the closest distance can be obtained by setting such a refractive power distribution that the refractive power of the second positive lens element G12 is actually slightly decreased. The conditional formula (3) is the one where a range of optimum refractive power rate between the first positive lens element G11 and the second positive lens element G12 is found out.

When exceeding an upper limit of the conditional formula (3), the refractive power of the second positive lens element G12 which moves for focusing becomes excessive. The fluctuations in aberration during focusing increase. In particular, the higher spherical aberration and the astigmatism are caused. The fluctuations in curvature of the astigmatism/image-surface become conspicuous, whereby it is difficult to attain the agreeable image forming performance. Whereas if under a lower limit of the conditional formula (3), the refractive power of the second positive lens element G12 is reduced. The moving quantity during focusing grows. The entire length of the zoom lens increases, and the fluctuations in aberration at this time also become large. Note that the lower limit value of the conditional formula (3) is set more preferably to 0.5 in order to accomplish the good image forming performance.

Based on the focusing system of this invention, on the occasion of focusing to the closest distance, the second positive lens element G12 in the focusing lens group G1 is moved toward the object. In this case, however, it is necessary to adequately secure the aerial spacing formed between the first positive lens element G11 positioned closest to the object in the focusing lens group G1 and the second positive lens element G12 positioned towards the image of the first positive lens element G11. Namely, this aerial spacing is important for securing a space for focusing and attaining the good aberration correction from the infinity to the closest distance in each variable-power-based magnification state.

For this reason, to acquire much greater effect of the focusing system according to the present invention, it is desirable that the following conditional formulae be satisfied:

$$0.01 < D/f1 < 0.5 \quad (4)$$

$$0.01 < D/f12 < 0.3 \quad (5)$$

where

D: the aerial spacing between the first lens element G11 and the second positive lens element G12 of the focusing lens group G1 in the infinity focusing state;

f1: the synthetic focal distance of the focusing lens group G1 in the infinity focusing state; and f12: the focal distance of the second positive lens element G12 of the focusing lens group G1.

If in excess of an upper limit of the conditional formula (4), the aerial spacing between the first positive lens element G11 and the second positive lens element G12 is excessively widened. The entire length of the zoom lens increases, and at the same time a lens diameter of the first positive lens element G11 closest to the object in the focusing lens group G1 extends. It is therefore difficult to miniaturize the lens system as a whole. Besides, there grow the fluctuations in various aberrations, especially in astigmatism on the occasion of focusing. Hence, the agreeable image forming performance can not be obtained. Whereas if under a lower limit of the conditional formula (4), the aerial spacing between the first positive lens element G11 and the second positive lens element G12 is excessively narrowed. It is hard to secure a space enough for the movement of the second positive lens element G12 for focusing. Further, the fluctuations in various aberrations during focusing augment, and particularly those in spherical aberration get remarkable. As a result, the agreeable image forming performance from the infinity to the closest distance can not be acquired. Incidentally, it is more preferable that the upper limit value of the conditional formula (4) is set to 0.15, while the lower limit value is set to 0.03 for the purpose of attaining more favorable image forming performance from the infinity to the closest distance.

The conditional formula (5) prescribes the focal distance f12 of the second positive lens element G12 and also an adequate rate of an aerial spacing D between the first positive lens element G11 and the second lens element G12. If above an upper limit of the conditional formula (5), the aerial spacing between the first positive lens element G11 and the second positive lens element G12 becomes too large. The entire length of the zoom lens increases. Simultaneously, the lens diameter of the first lens element G11 closest to the object in the focusing lens group G1 becomes large. It is therefore difficult to miniaturize the whole zoom lens system. Further, the focal distance f12 of the second positive lens element G12 is diminished, whereby the fluctuations in various aberrations during focusing grow. Especially, the fluctuations in curvature of the astigmatism/image-surface augment, with the result that the good image forming performance can not be obtained. Reversely, if under a lower limit of the conditional formula (5), the aerial spacing between the first positive lens element G11 and the second positive lens element G12 becomes too narrow. It is hard to secure the space in which the second lens element G12 moves for focusing. In addition, the fluctuations in various aberrations during focusing augment. It is therefore impossible to obtain the agreeable image forming performance from the infinity to the closest distance. Further, the focal distance f12 of the second positive lens element G12 is lengthened. The moving quantity of the second lens element G12 during focusing for a certain object becomes large. Hence, there is a possibility to mechanically interfere with the first positive lens element G11. It is to be noted that the upper limit value of the conditional formula (5) is set more preferably to 0.07, while the lower limit value is set more preferably to 0.03 for achieving more favorable image forming performance from the infinity to the closest distance.

Moreover, in the zoom lens incorporating the internal focusing system according to this invention, for the purpose of obtaining the good image forming performance, it is desirable that the following formula be met with respect to the refractive power distributions of the focusing lens group G1 exhibiting the positive refractive power and positioned closest to the object and of the first positive lens element G11 positioned closest to the object in this focusing lens group G1:

$$0.5 \leq f11/f1 \leq 1.4 \quad (6)$$

where f1 is the synthetic focal distance of the focusing lens group G1 in the infinity focusing state, and f11 is the focal distance of the first positive lens element G11 of the focusing lens group G1.

If over an upper limit of the conditional formula (6), the proper refractive power distribution is broken in the focusing lens group G1. It is difficult to effect a wellbalanced compensation of the various aberrations. Besides, the refractive power of the first positive lens element G11 is relatively weakened in the focusing lens group G1. Hence, a luminous flux passing through the first positive lens element G11 decays in terms of a degree of convergence. Therefore, the lens diameters of the respective lens elements positioned closer to the image than the first positive lens element G11 increase. In consequence, this unfavorably conduces to an increase in size of the zoom lens. Whereas if under a lower limit of the conditional formula (6), the fluctuations in aberration during focusing to the closest distance unfavorably become large. Note that the lower limit value of the conditional formula (6) is set more preferably to 1 in order to attain the good image forming performance from the infinity to the closest distance.

With the intention of obtaining more excellent image forming performance from the wide-angle end to the telephoto end and simultaneously acquiring the agreeable focusing performance from the infinity to the closest distance, it is desirable that the respective lens elements constituting the focusing lens group G1 assumes shapes defined by the following formulae (7)–(9).

$$0.75 \leq q11 \leq 2 \quad (7)$$
$$0.9 \leq q12 \leq 3 \quad (8)$$
$$-1.6 \leq q13 \leq 3 \quad (9)$$

where q11, q12, q13 are the shape factors of the first positive lens element G11, the second positive lens element G12 and the third negative lens element G13. These shape factors are defined such as:

$$qli = \frac{Rb + Ra}{Rb - Ra}$$

where Ra is the radius of curvature of the surface closest to the object, Rb is the radius of curvature of the surface closest to the image among the surfaces constituting the respective lens elements, and i is 1 to 3.

The conditional formulae (7), (8) and (9) will hereinafter be described in sequence.

The conditional formula (7) prescribes the shapes of the lenses which constitute the first positive lens element G11 closest to the object in the focusing lens group G1.

The first positive lens element G11 is positioned closest to the object in the optical system of this invention. Besides, the magnifying power by the rear variable power lens group G2 is greater at the telephoto end than at the wide-angle end. The aberration caused by the first positive lens element G11 is more enlarged at the telephoto end. Therefore, the aberration produced in the first positive lens element G11 is, it is desirable, reduced to the greatest possible degree in order to restrain the various aberrations at the telephoto end down to a small level.

If above an upper limit (7) of the conditional formula (7), a large negative spherical aberration and a curvature of the image surface are caused at the telephoto end. An astigmatism and a coma aberration become great. Note that the upper limit value of the conditional formula (7) is set more preferably to 1.1 for attaining the more favorable image forming performance.

Whereas if under a lower limit of the conditional formula (7), the large negative spherical aberration is produced at the telephoto end. The coma aberration also increases. A large negative image surface curvature is produced over the entire zoom area. Further, the astigmatism also grows.

Incidentally, where the first positive lens element G11 is composed of a single lens, and when a lens material involves the use of special ultra-low dispersion glass such as fluorite, a color aberration caused in the first lens element G11 can be reduced. A superlative image forming performance is thereby acquired. This effect is conspicuous at the telephoto end. When the first positive lens element G12 is constructed of two or more lenses, the good performance is attainable within a much wider range i.e., the lower limit is 0.65, while the upper limit is 3, than that shown in the formula (7) depending on an increment in the number of constitutional surfaces and a rise in degree of freedom for selecting the glass.

The conditional formula (8) shows the shapes of the lenses constituting the second positive lens element G12 movable for focusing.

If above an upper limit of the conditional formula (8), a positive spherical aberration and the image surface curvature are produced at the telephoto end. The astigmatism also becomes large. The good image forming performance can not be obtained. Note that the upper limit value of the conditional formula (8) is set more preferably to 1.5 for achieving the good image forming performance.

Whereas if under a lower limit of the conditional formula (8), the negative spherical aberration and the image surface curvature are produced at the telephoto end. The astigmatism also becomes large, and no good image forming performance is thereby obtained.

The conditional formula (9) shows the shapes of the lenses constituting the third negative lens element G13 of the focusing lens group G1. If over an upper limit of the formula (9), the positive spherical aberration and the image surface curvature are caused at the telephoto end. The astigmatism also increases so much. No good image forming performance is thereby acquired. Incidentally, for achieving a more favorable image forming performance, it is preferable that the upper limit of the conditional formula (9) is set to 1, while the lower limit is set to −1.3.

In order to achieve a favorable color aberration compensation from the infinity to the closest distnace during focusing, the second positive lens group G12 movable for focusing among the lens elements constituting the focusing lens group G1 is composed of at least a single piece of positive lens and a single piece of negative lens, and it is desirable that the following formulae be satisfied:

$$20 \leq \Delta\gamma d \leq 70 \quad (10)$$

$$20 \leq \Delta\gamma g \leq 60 \quad (11)$$

where $\Delta\gamma d$ and $\Delta\gamma g$ are the differences of Abbe numbers $\gamma d$ and $\gamma g$ of glass materials of which the two lenses are composed.

However, the Abbe numbers $\gamma d$ and $\gamma g$ are defined by the following formula:

$$vd = \frac{nd - 1}{nF - nc}, vg = \frac{nd - 1}{ng - nd}$$

where nd: the refractive index of the glass material which is based on a d-line (587.6 nm);

nF: the refractive index of the glass material which is based on an F-line (486.1 nm);

nc: the refractive index of the glass material which is based on a g-line (435.8 nm).

If above upper limits of the conditional formulae (10) and (11), the color aberration is excessively compensated during focusing to the closest distance. Whereas if under lower limits of the conditional formulae (10) and (11), the color aberration during focusing to the closest distance is insufficiently compensated. Hence, in any case of being beyond the upper limits and under the lower limits, no good image forming performance from the infinity to the closest distance is obtained. Incidentally, it is more preferable that the upper limit value of the conditional formula (10) is set to 50, the lower limit value thereof is set to 30, the upper limit value of the conditional formula (11) is set to 41, and the lower limit value thereof is set to 25 with a view to achieving the more favorable image forming performance.

In particular, when being applied to a lens having a long focal distance, a special low-dispersion glass material such as fluorite is employed as a material of the lenses configuring the second positive lens element G12 which moves for focusing. An excellent compensation of the color aberration is thereby attainable.

The zoom lens based on the internal focusing system described above, as illustrated in FIGS. 1 through 9, preferably includes, sequentially from the object, the first lens group G1 (focusing lens group) exhibiting the positive refractive power, the second lens group (variable power lens group) G2 having the variable power function and the negative refractive power, the third lens group G3 (image surface position compensating lens group) having the positive refractive power and the function to compensate the image surface position which fluctuates due to the variable power, and a fourth lens group G4 (image forming lens group) having an image forming function and the positive refractive power.

In this case, the first lens group G1 incorporates, sequentially from the object, the first lens element G11 exhibiting the positive refractive power, the second lens element G12 exhibiting the positive refractive power and the third lens element G13 exhibiting the negative refractive power. When focusing to the closest distance, the second positive lens element G12 of the first lens group G1 is moved towards the object.

At this time, a highly important thing for keeping the good performance during the variable power operation is the proper refractive power distribution with respect to the first lens group (focusing lens group) G1 having the positive refractive power and the second lens group G2 having the negative refractive power and incorporating the variable power function. For this reason, it is desirable the following formula (12) be satisfied:

$$-5.5 \leq f1/f2 \leq -4.0 \quad (12)$$

where f1 is the focal distance of the first lens group G1 (focusing lens group) G1 in the infinity focusing state, and f2 is the focal distance of the second lens group (variable power lens group) G2 having the negative refractive power.

When exceeding an upper limit of the conditional formula (12), the refractive power of the second lens group defined as the variable power group declines. The spherical aberration is insufficiently compensated in the whole lens system. The Petzval sum shifts in a positive direction. Besides, a curvature of the image surface increases. Further, the moving quantity of the second lens group G2 during the variable power operation becomes large. This is unsuitable for miniaturizing the lenses. Whereas if under a lower limit of the conditional formula (12), the refractive power of the second lens group G2 defined as the variable power group is intensified. The spherical aberration is excessively compensated in the whole lens system. The Petzval sum also shifts in a negative direction. Besides, the curvature of the image surface increases. Note that the lower limit value of the conditional formula (12) is set more preferably to −4.3 for attaining the more agreeable image forming performance.

Furthermore, where the first lens group (focusing lens group) G1 consists, as described above, of the three positive/positive/negative lens elements, the importance is given to the refractive power distribution associated with the first lens element G13 having only one negative refractive power among the lens elements which constitute the first lens group G1. In particular, it is preferable to meet the proper refractive power distributions shown in the following condition (13) and associated with the third negative lens element G13 and the second lens group (variable lens group) G2 defined as the variable power group.

$$7 \leq f13/f2 \leq 20 \quad (13)$$

where f13: the focal distance of the third negative lens element of the first lens group G1; and f2: the focal distance of the second negative lens group G2.

The reason for this will be elucidated as follows. The third negative lens element G13 of the first lens group and the second negative lens group G2 conceived as the variable power group are disposed adjacently to each other within the optical system. A distance therebetween is varied when effecting the variable power operation. Changed so much in both of them are a height (height of entering ray) and an angle (incident angle) at which the luminous fluxes (on-axis luminous flux and out-of-axis luminous flux) pass through. A contribution to the fluctuations in aberration of the whole lens system during the variable power operation is very large. More specifically, the luminous fluxes (on-axis luminous flux and out-of-axis luminous flux) are incident on the third negative lens element G13 of the first lens group G1, those fluxes undergoing the convergent action through the two lens elements, i.e., the first positive lens element G11 and the second positive lens element G12. For this reason, the angles (or incident angles) of the luminous fluxes with respect to the optical axis are relatively large. Variations thereof increase during the variable power and focusing operations, whereby the fluctuations in aberration become large. The third negative lens element G13 of the first lens group is disposed away from an entrance pupil position. Hence, there increases the height (height of entering ray) from the optical axis at which the luminous fluxes (on-axis luminous flux and out-of-axis luminous flux) in the third negative lens element G13. Variations in height of entering ray during the variable power and focusing operations also grow, and the fluctuations in aberration are thereby augmented. For this reason, the aberration tends to be generated in the third negative lens element G13. Providing the third lens element G13 with an intensified refractive power is an excessive load in terms of compensating the aberration.

On the other hand, the second lens group G2 serving as the variable power group has a relatively large angle (or incident angle) of the luminous flux with respect to the optical axis. Variations thereof during the variable power and focusing operations are also large, which is the same with the third negative lens element G13. However, the height (height of entering ray) of the luminous fluxes (on-axis luminous flux and out-of-axis luminous flux) penetrating the second lens group G2 is smaller than in the third negative lens element G13. Variation thereof during the variable power and focusing operations are also smaller than in the third lens element G13. Namely, it is assumed that a height of the principal ray represents the height at which the luminous flux penetrating the second lens group (variable power lens group) passes. Based on this assumption, this is considerably small, i.e., approximately ⅛ to 1/10 the height of the principal ray penetrating the third negative lens element G13. The changes thereof during the variable power and focusing operations are also small. As a result, the second lens group can be constructed to exhibit a strong refractive power.

The conditional formula (13) shows loads of proper aberrations relative to the third negative lens group G13 and the second lens group (variable power lens group) G2 at that moment. If in excess of an upper limit of the conditional formula (13), the aberration caused in the second lens group G2 increases so much. Especially, the excessive positive spherical aberration and the negative Petzval sum are produced. The fluctuations in aberration during the variable power operation also become large, and no good image forming performance can be obtained. Whereas if under a lower limit of the conditional formula (13), the aberration produced in the third negative lens element G13 remarkably increase. Caused particularly are the positive spherical aberration and the negative Petzval sum. The curvature of the image surface becomes conspicuous, and the agreeable image forming performance can not be acquired. Note that the upper limit value of the conditional formula (13) is set more preferably to 13 for the purpose of achieving the good image forming performance.

Next, the lens structures in the respective embodiments will be explained.

FIG. 1 is a diagram illustrating a lens structure and a light path in the first embodiment of the present invention. The zoom lens in a first embodiment has a focal distance f variable from 100 to 300 and an F number of 4.5. As depicted in FIG. 1, the first lens group (focusing lens group) G1 consists of: the first lens element G11 composed of a positive meniscus lens $L_{11}$ having a convex surface directed to the object; a second positive lens element G12 incorporating a focusing function and composed of a negative meniscus lens $L_{12N}$ having a convex surface directed to the object and a positive lens $L_{12P}$ joined thereto and having a larger curvature convex surface directed to the object; and the third negative lens element G13 consisting of a negative meniscus lens $L_{13N}$ having a larger curvature concave surface directed the object and a positive meniscus lens $L_{13P}$ joined thereto and having a convex surface directed to the object.

The second lens group G2 conceived as a variable power lens group consists of a double concave negative lens $L_{21}$, a double concave negative lens $L_{22N}$ and a positive lens $L_{22P}$ joined thereto and having a larger curvature convex surface directed to the object. The third lens group G3 defined as an image surface compensating group is composed of a positive double convex lens $L_{3P}$ and a negative meniscus lens $L_{3N}$ joined thereto and having a convex surface directed to the image. The fourth lens group G4 incorporating the image forming function consists of a positive lens $L_{41}$ having a larger curvature convex surface directed to the object, a negative double concave lens $L_{42}$, a double convex positive lens $L_{43}$ and a negative meniscus lens $L_{44}$ having a convex surface directed to the image.

Figure 2:
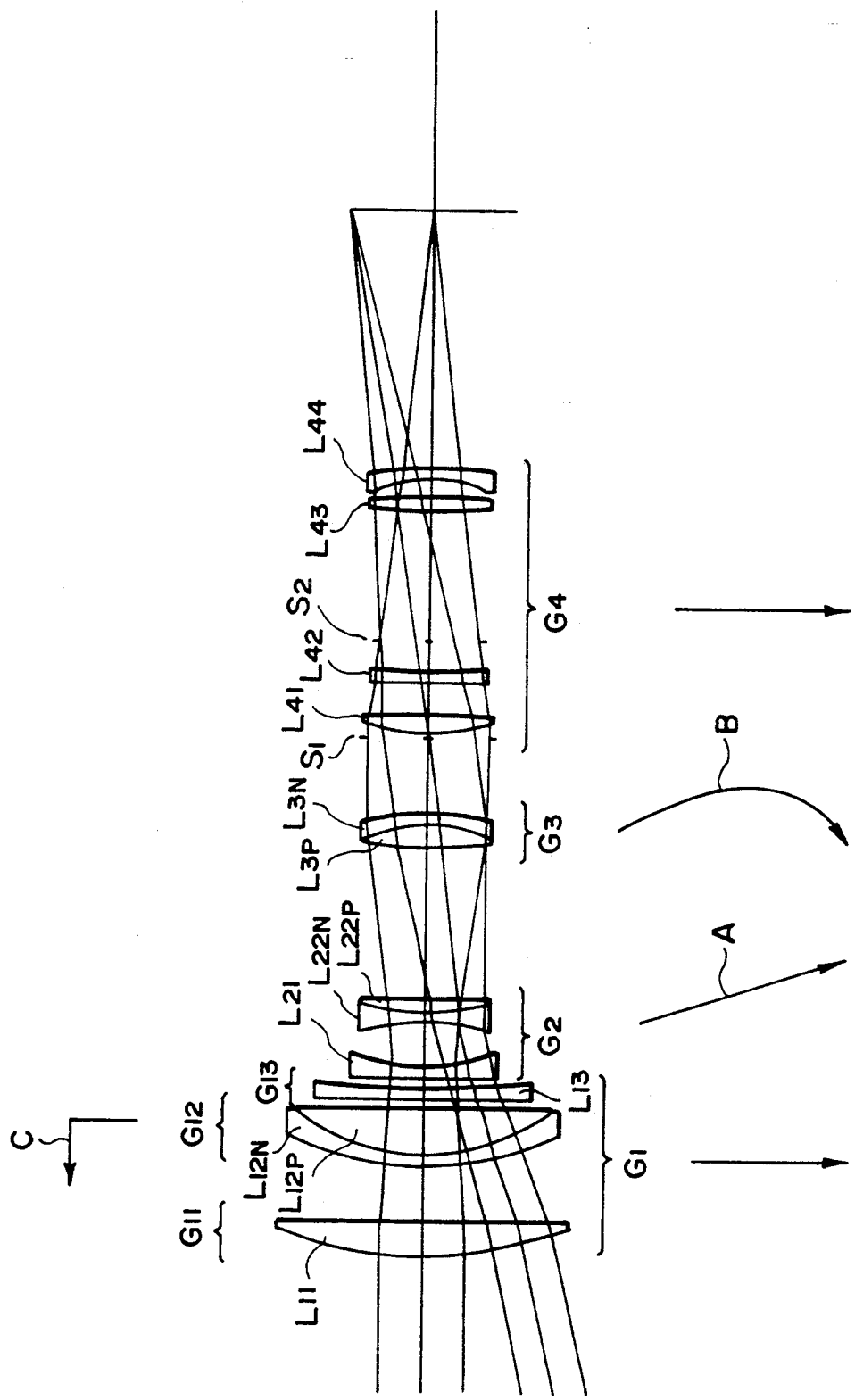
FIG. 2 is a block diagram of an optical system, illustrating a lens placement and a light path in a second embodiment of the present invention.

The zoom lens in a second embodiment illustrated in FIG. 2, as in the first embodiment, has the focal distance f variable from 100 to 300 and the F number of 4.5. As can be clarified from FIG. 2 illustrating a lens structure and a light path in the second embodiment, this embodiment has the same lens shapes as those in the first embodiment discussed above with respect to the second lens group G2 through the fourth lens group G4. However, the third negative lens element G13 of the first lens group G1 is constructed of a negative meniscus lens $L_{13}$ having a larger curvature surface directed to the image. With this arrangement, the refractive powers and shapes of the respective elements of the first lens group G1 are slightly different from those in the first embodiment.

Figure 3:
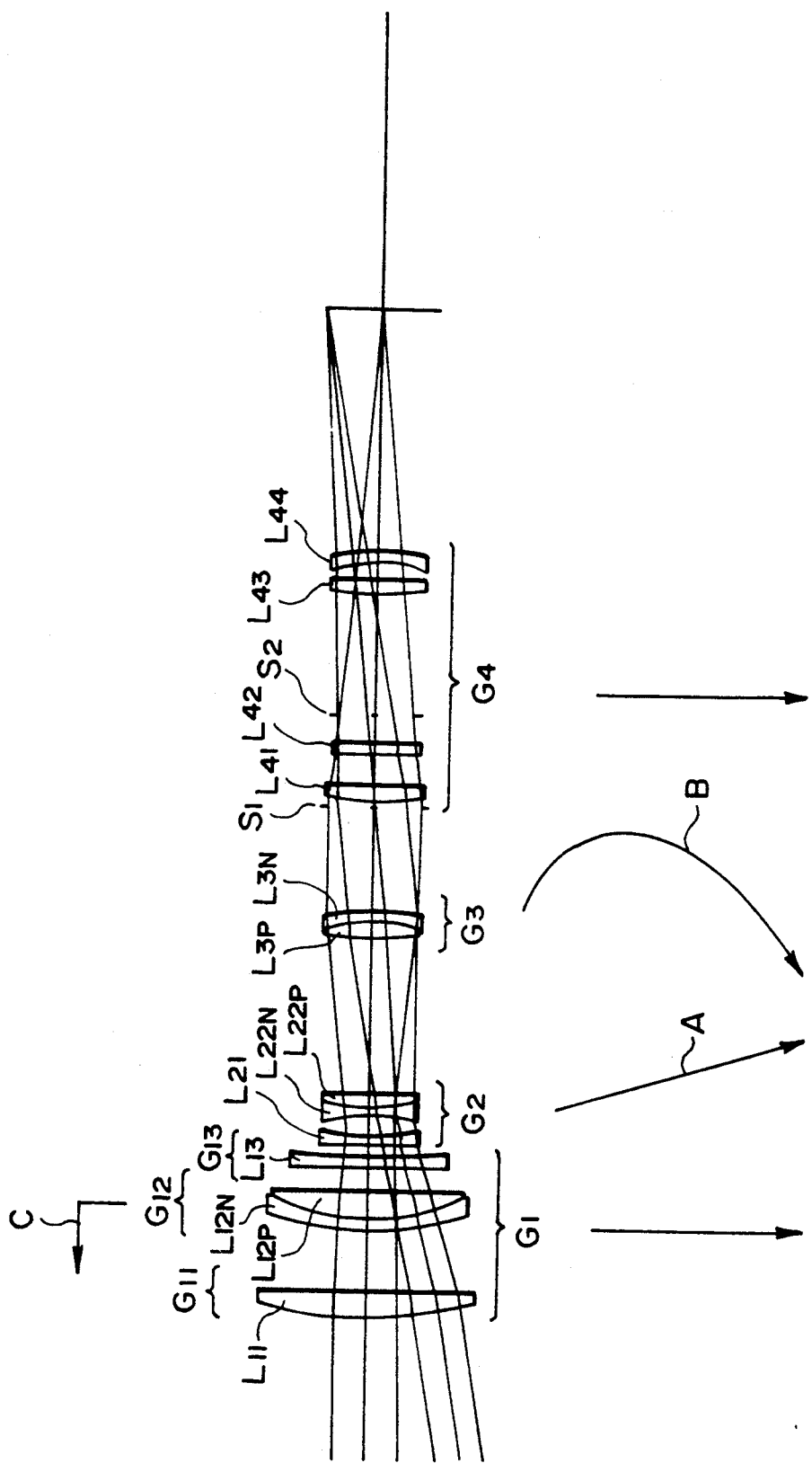
FIG. 3 is a block diagram of an optical system, illustrating a lens placement and a light path in a third embodiment of the present invention.

The zoom lens in a third embodiment illustrated in FIG. 3, in which its focal distance is more extended to the telephoto side than in the first and second embodiments, has the focal distance f variable from 135 to 405 and the F number of 5.6. As can be understood from FIG. 3 showing a lens structure and a light path in the third embodiment, the zoom lens in accordance with this embodiment fundamentally assumes the same lens structure with the second embodiment, although the first lens element G11 consists of a double convex lens $L_{11}$, and the third lens element consists of a double concave lens $L_{13}$.

Note that in the above-mentioned first through third embodiments, to obtain the well-compensated color aberration, the ultra-low dispersion glass materials are applied to the positive lens $L_{11}$ constituting the first lens element G11 of the first lens group G1, the positive lens $L_{12P}$ of the second positive lens element G12 incorporating the focusing function and the positive lens $L_{41}$ closest to the object in the fourth lens group G4.

Figure 4:
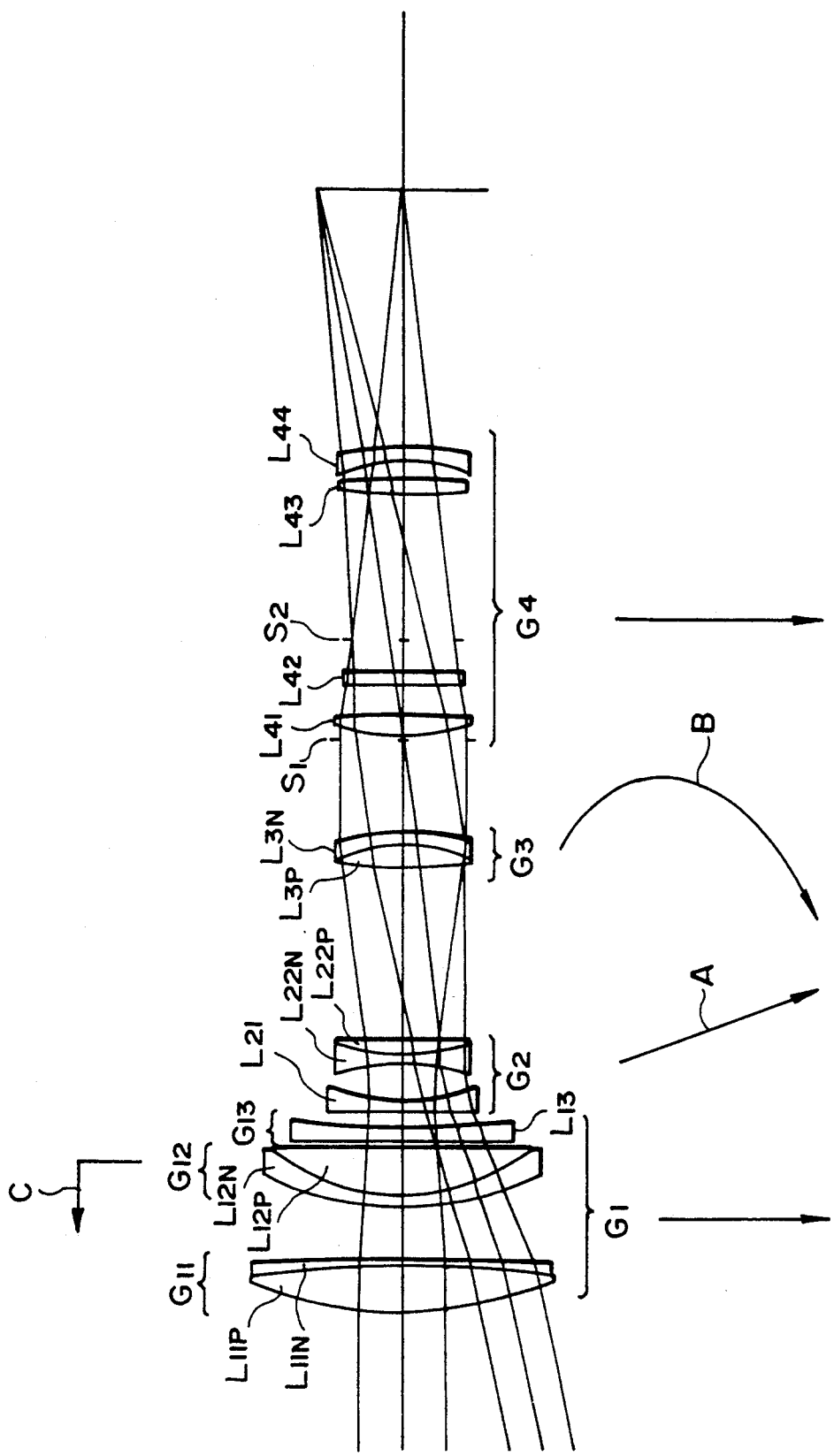
FIG. 4 is a block diagram of an optical system, illustrating a lens placement and a light path in a fourth embodiment of the present invention.

The zoom lens in a fourth embodiment shown in FIG. 4 has the focal distance f variable from 100 to 300 and the F number of 4.5. As can be clarified from FIG. 4 depicting a lens structure and a light path in the fourth embodiment, this embodiment has basically the same lens structure with the second and third embodiments. However, the first positive lens element G11 closest to the object in the first lens group (focusing lens group) G1 is composed of joint lenses including a double convex positive lens $L_{11P}$ and a negative meniscus lens $L_{11N}$ joined thereto and having a larger curvature concave surface directed to the object.

Note that in this embodiment, for obtaining a further-well-compensated color aberration, the ultra-low dispersion glass materials are applied to a positive lens $L_{12P}$ of the second positive lens element G12 incorporating the focusing function and a positive lens $L_{41}$ closest to the object in the fourth lens group G4.

Figure 5:
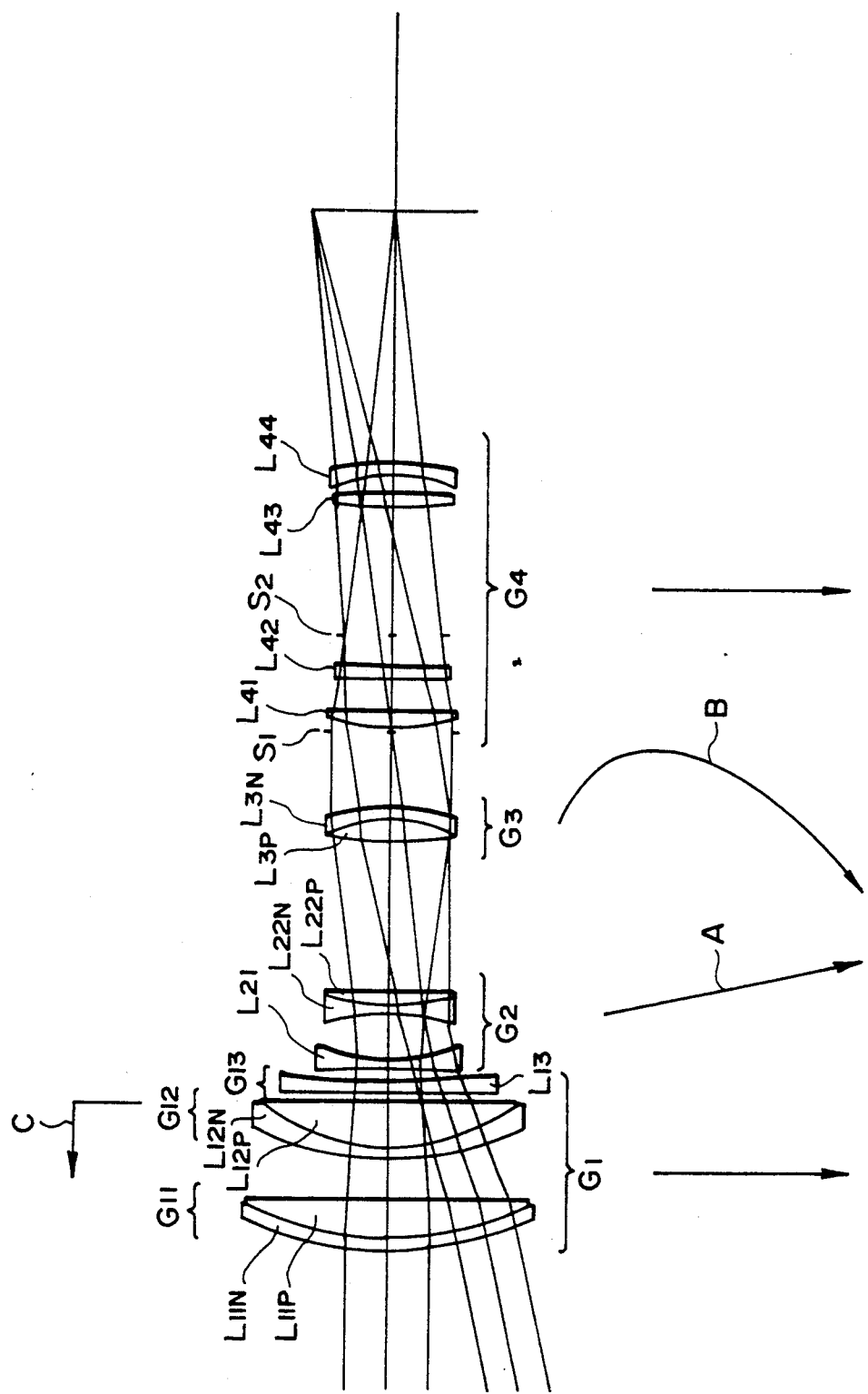
FIG. 5 is a block diagram of an optical system, illustrating a lens placement and a light path in a fifth embodiment of the present invention.

The zoom lens in a fifth embodiment depicted in FIG. 5 has the focal distance f variable from 100 to 300 and the F number of 4.5. As can be understood from FIG. 5 illustrating a lens structure and a light path in the fifth embodiment, the fifth embodiment has basically the same lens structure with the fourth embodiment. Reversed to the fourth embodiment is the placement of the negative lens and the positive lens of the joint lenses constituting the first positive lens element G11 closest to the object in the first lens group (focusing lens group) G1. More specifically, the first positive lens element G11 is constructed of the negative meniscus lens $L_{11N}$ having the convex surface directed to the object and the positive meniscus lens $L_{11P}$ joined thereto and having the larger curvature convex surface directed to the object.

Note that to acquire the further-well-compensated color aberration, the ultra-low dispersion glass materials are applied to a positive lens $L_{12P}$ of the second positive lens element G12 having the focusing function and a positive lens $L_{41}$ closest to the object in the fourth lens group G4.

Figure 6:
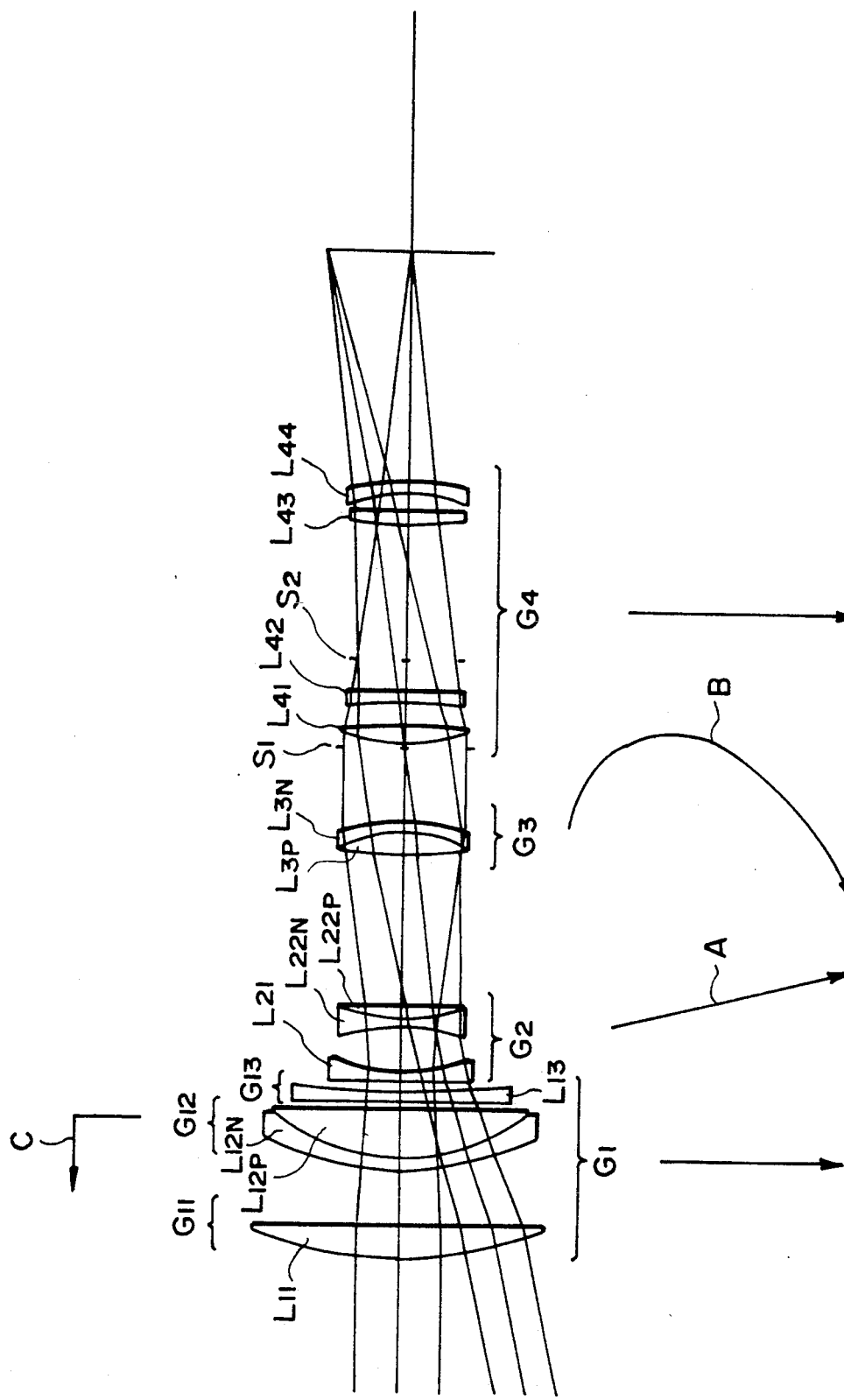
FIG. 6 is a block diagram of an optical system, illustrating a lens placement and a light path in a sixth embodiment of the present invention.

The zoom lens in a sixth embodiment depicted in FIG. 6 has the focal distance f variable from 100 to 300 and the F number of 4.5. As can seen from FIG. 6 illustrating a lens structure and a light path in the sixth embodiment, this embodiment has a lens structure fundamentally substantially similar to that of the first embodiment. However, the third negative lens element G13 configuring a part of the first lens group (focusing lens group) G1 consists of a single piece of negative lens $L_{13}$. With this arrangement, the refractive powers and shapes of the respective lens elements combined to form the first lens group G1 slightly differ.

Figure 7:
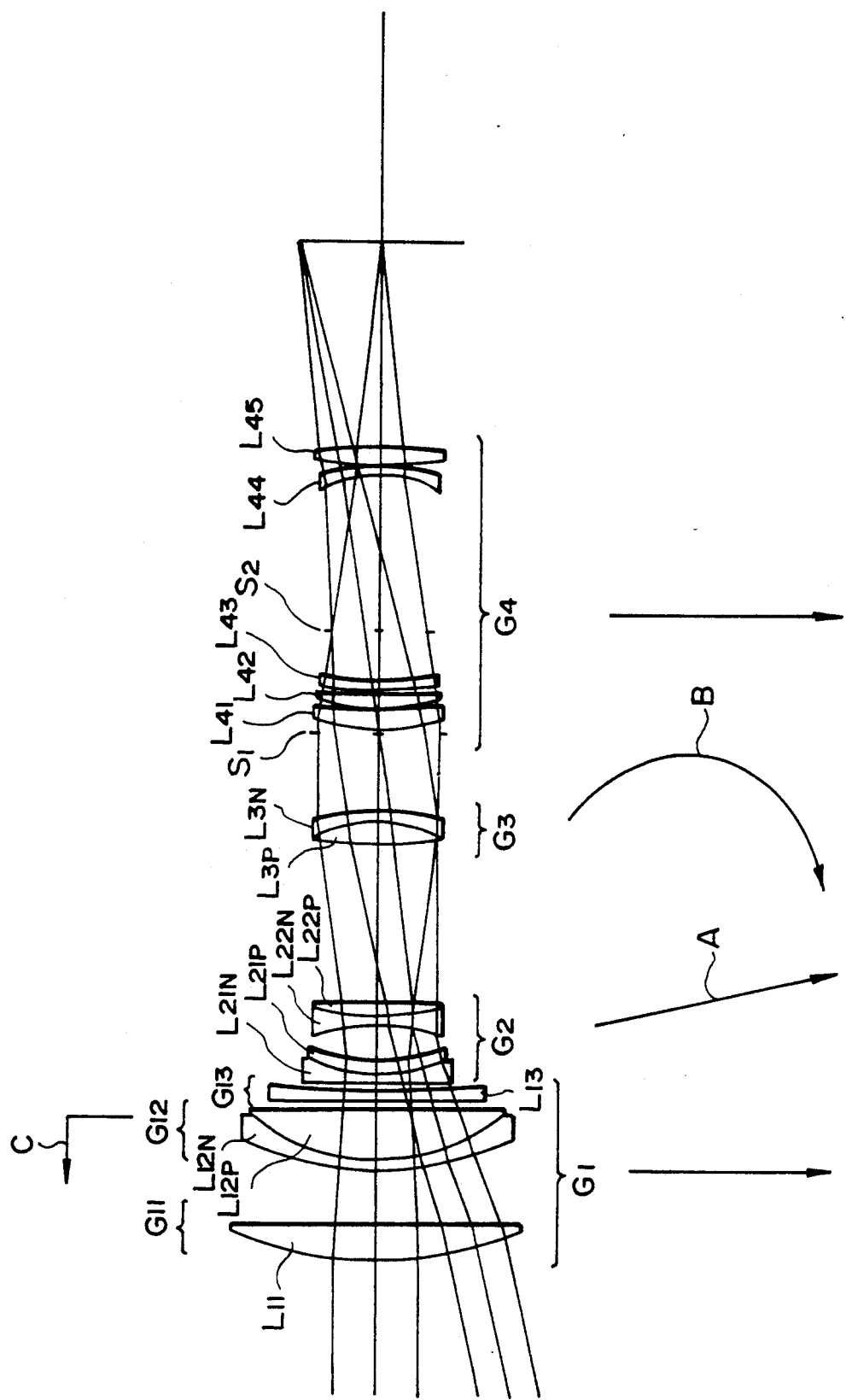
FIG. 7 is a block diagram of an optical system, illustrating a lens placement and a light path in a seventh embodiment of the present invention.

The zoom lens in a seventh embodiment shown in FIG. 7 has the focal distance f variable from 100 to 300 and the F number of 4.5. As can be seen from FIG. 7 depicting a lens structure and a light path in the seventh embodiment, this embodiment assumes a lens structure substantially similar to that of the second embodiment with respect to the first lens group (focusing lens group) G1 and the third lens group (image surface position compensating lens group) G3. However, the second lens group (variable power lens group) G2 and the fourth lens group (image forming lens group) G4 are different.

The second lens group G2 includes: joint lenses having a negative double concave lens $L_{21N}$ and a positive meniscus lens $L_{21P}$ joined thereto and having a convex surface directed to the object; and joint lenses having a double concave negative lens $L_{22N}$ and a positive lens $L_{22P}$ joined thereto and having a larger curvature surface directed to the object.

The fourth lens group G4 is composed of a positive meniscus lens $L_{41}$ having a convex surface directed to the object, a positive lens $L_{42}$, a negative lens $L_{43}$, a negative lens $L_{44}$ having a convex surface directed to the image and a double convex positive lens $L_{45}$.

Figure 8:
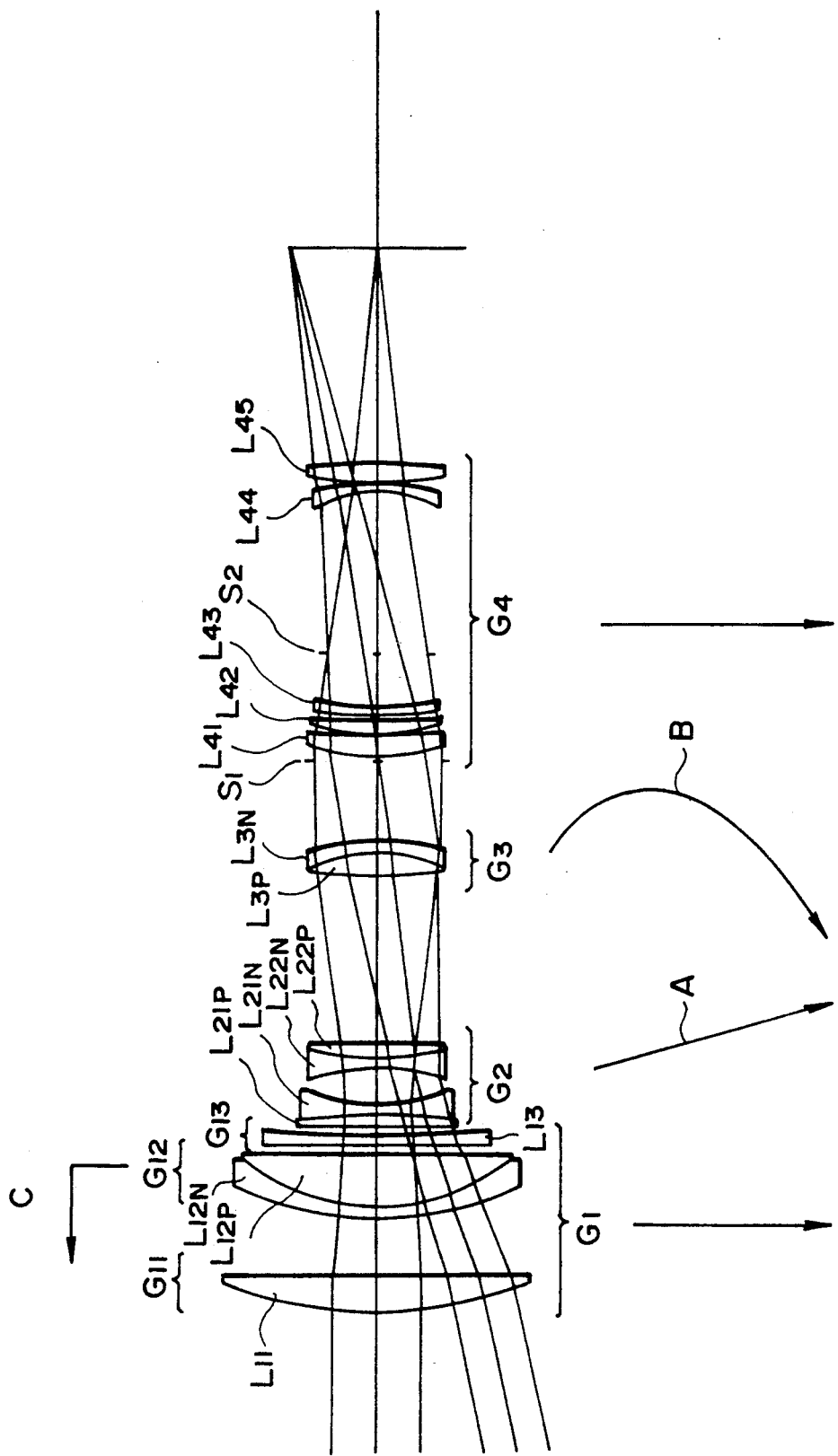
FIG. 8 is a block diagram of an optical system, illustrating a lens placement and a light path in an eighth embodiment of the present invention.

The zoom lens in an eight embodiment shown in FIG. 8 has the focal distance f variable from 100 to 300 and the F number of 4.5. As can be clarified from FIG. 8 illustrating a lens structure and a light path in the eighth embodiment, this embodiment assumes a lens structure basically similar to that in the seventh embodiment. Reversed to the seventh embodiment is the placement of the negative lens $L_{21N}$ and the positive lens $L_{21P}$ constituting the joint lens element closest to the object in the second lens group (variable power lens group) G2.

Note that in the seventh and eighth embodiments, for attaining a further-well-compensated color aberration, the ultra-low dispersion glass materials are applied to the positive meniscus lens $L_{11}$ configuring the first positive lens element G11 and the positive lens $L_{12P}$ of the second positive lens element (positive lens group) G12 incorporating the focusing function.

Figure 9:
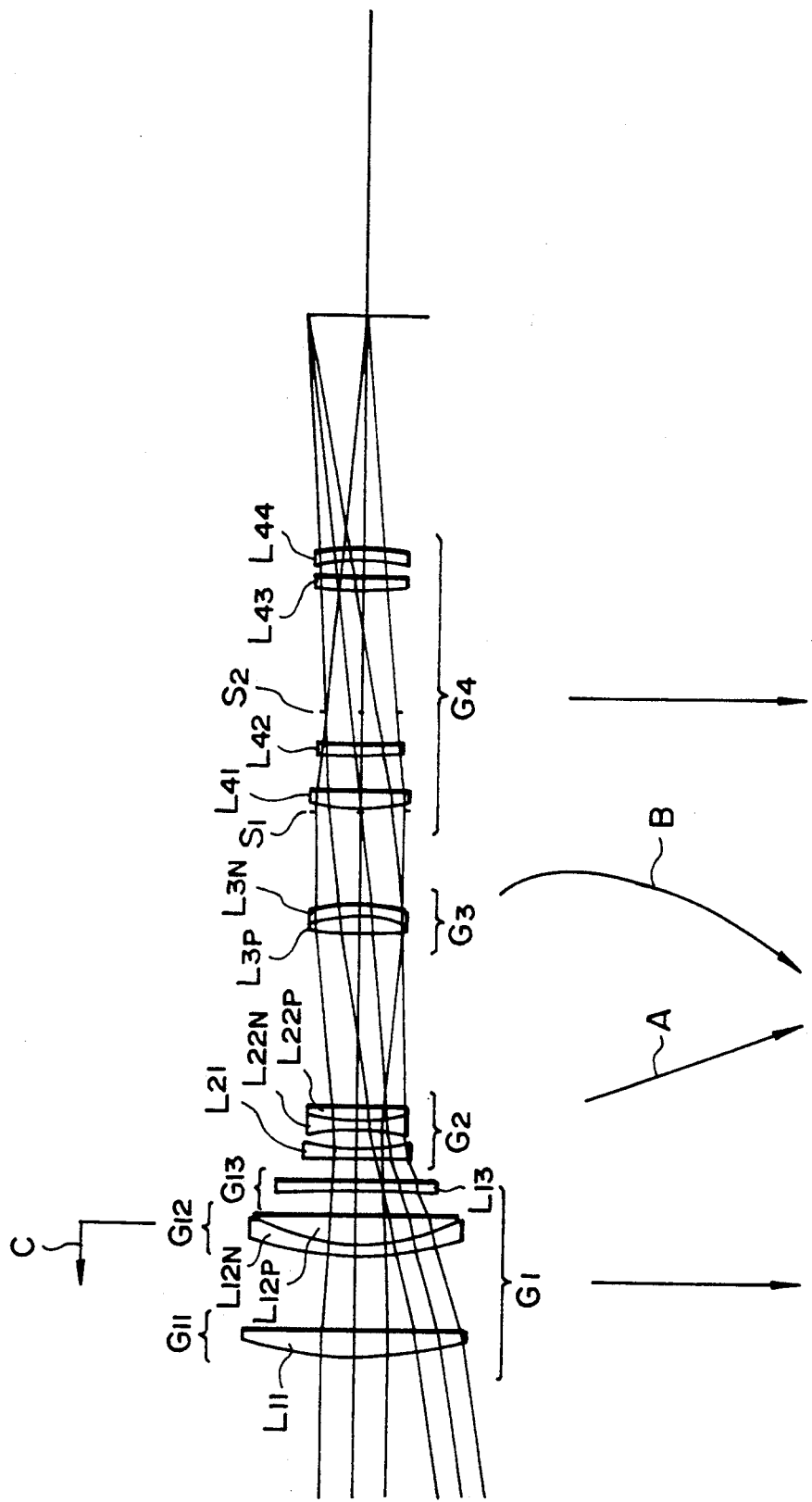
FIG. 9 is a block diagram of an optical system, illustrating a lens placement and a light path in a ninth embodiment of the present invention.

The zoom lens in a ninth embodiment, in which the focal distance is more extended to the telephoto side than in the second embodiment, has the focal distance f variable from 135 to 405 and the F number of 5.6. As can be seen from FIG. 9 depicting a lens structure and a light path in the ninth embodiment, the zoom lens in this embodiment has basically the same lens structure with the second embodiment.

Note that in this embodiment, to obtain a further-well-compensated color aberration, the ultra-low dispersion glass materials are applied to the positive meniscus lens $L_{11}$ configuring the first positive lens element (positive lens group) G11 and the positive lens $L_4$ closest to the object in the fourth lens group G4.

The following Tables 1-9, each consisting of two parts, show items of the respective embodiments of the present invention.

In the Tables, numerals appearing in the left most columns of the first parts indicate the order from the object, r is the radius of curvature, d denotes the lens surface interval, $\gamma$ is the Abbe number ($\gamma d$), the numeral within the parentheses under the Abbe number $\gamma$ is the Abbe number $\gamma g$. n is the refractive index in the d-line ($\lambda = 587.6$ nm), f is the focal distance of the whole system, FN is the F number, D0 is the distance from the object to be photographed to the first surface of the lens, and $\beta$ is the close distance photographing magnification.

Table 10 shows conditional correspondence values of the respective embodiments of the present invention.

TABLE 1

(First Embodiment)

Part 1
Focal distance: f = 100 to 300, F number: FN = 4.5

| | r | d | v | n | | |
|---|---|---|---|---|---|---|
| 1 | 104.200 | 9.00 | 82.6 | 1.49782 | G11 | |
| 2 | 2254.650 | (d2) | | | | |
| 3 | 79.900 | 3.00 | 33.9 (26.2) | 1.80384 | | |
| 4 | 51.500 | 14.30 | 82.6 (66.9) | 1.49782 | G12 | G1 |
| 5 | −10499.426 | (d5) | | | | |
| 6 | 1900.000 | 3.00 | 52.3 | 1.74810 | | |
| 7 | 146.00 | 3.20 | 30.1 | 1.69895 | G13 | |
| 8 | 238.479 | (d8) | | | | |
| 9 | −600.000 | 2.50 | 58.5 | 1.65160 | | |
| 10 | 46.300 | 9.00 | | | | |
| 11 | −54.999 | 2.50 | 53.8 | 1.69350 | G2 | |
| 12 | 58.147 | 3.50 | 23.0 | 1.86074 | | |
| 13 | −6531.374 | (d13) | | | | |
| 14 | 130.000 | 6.00 | 70.1 | 1.51860 | | |
| 15 | −35.300 | 2.80 | 33.9 | 1.80384 | G3 | |
| 16 | −61.483 | (d16) | | | | |
| 17 | 52.850 | 5.00 | 82.6 | 1.49782 | | |
| 18 | −325.650 | 9.00 | | | | |
| 19 | −710.000 | 3.00 | 25.4 | 1.80518 | | |
| 20 | 286.699 | 40.00 | | | G4 | |
| 21 | 137.000 | 4.00 | 45.9 | 1.54814 | | |
| 22 | −218.675 | 4.30 | | | | |
| 23 | −36.400 | 3.00 | 60.3 | 1.51835 | | |
| 24 | −82.412 | (Bf) | | | | |

Part 2

| f | 100.000 | 200.000 | 200.004 |
|---|---|---|---|

TABLE 1-continued (First Embodiment)

| | | | |
|---|---|---|---|
| D0 | ∞ | ∞ | ∞ |
| d2 | 11.777 | 11.777 | 11.777 |
| d5 | 1.276 | 1.276 | 1.276 |
| d8 | 2.856 | 41.059 | 53.794 |
| d13 | 39.978 | 20.579 | 1.179 |
| d16 | 21.067 | 2.263 | 8.928 |
| Bf | 65.811 | 65.811 | 65.811 |
| β | −.060 | −.126 | −.181 |
| D0 | 1730.354 | 1730.354 | 1730.354 |
| d2 | .626 | .626 | .626 |
| d5 | 12.426 | 12.426 | 12.426 |
| d8 | 2.856 | 41.059 | 53.794 |
| d13 | 39.978 | 20.579 | 1.179 |
| d16 | 21.067 | 2.263 | 8.928 |
| Bf | 65.811 | 65.811 | 65.811 |

TABLE 2

(Second Ebodiment)

Part 1
Focal distance: f = 100 to 300,
F number: FN = 4.5

| | r | d | ν | n | | |
|---|---|---|---|---|---|---|
| 1 | 100.700 | 9.00 | 82.6 | 1.49782 | G11 | |
| 2 | 4521.274 | (d2) | | | | |
| 3 | 81.200 | 3.00 | 39.6 (31.1) | 1.80454 | G12 | G1 |
| 4 | 53.400 | 11.70 | 82.6 (66.9) | 1.49782 | | |
| 5 | 759.864 | (d5) | | | | |
| 6 | 3000.000 | 3.50 | 40.9 | 1.79631 | G13 | |
| 7 | 287.802 | (d7) | | | | |
| 8 | −807.000 | 2.50 | 50.8 | 1.65844 | | |
| 9 | 44.760 | 12.00 | | | | |
| 10 | −54.300 | 2.50 | 55.6 | 1.69680 | G2 | |
| 11 | 62.000 | 3.50 | 23.0 | 1.86074 | | |
| 12 | −712.817 | (d12) | | | | |
| 13 | 137.000 | 5.80 | 70.1 | 1.51860 | G3 | |
| 14 | −35.100 | 2.80 | 33.9 | 1.80384 | | |
| 15 | −60.378 | (d15) | | | | |
| 16 | 53.700 | 5.00 | 82.8 | 1.49782 | | |
| 17 | −281.245 | 8.00 | | | | |
| 18 | −872.000 | 3.00 | 27.6 | 1.75520 | | |
| 19 | 236.527 | 41.00 | | | G4 | |
| 20 | 122.500 | 4.00 | 49.1 | 1.53172 | | |
| 21 | −250.000 | 4.30 | | | | |
| 22 | −37.700 | 3.00 | 54.6 | 1.51454 | | |
| 23 | −92.967 | (Bf) | | | | |

Part 2

| f | 100.000 | 199.697 | 299.698 |
|---|---|---|---|
| D0 | ∞ | ∞ | ∞ |
| d2 | 14.080 | 14.080 | 14.080 |
| d5 | 2.690 | 2.690 | 2.690 |
| d7 | 2.669 | 41.124 | 53.943 |
| d12 | 38.983 | 19.710 | .438 |
| d15 | 20.567 | 1.384 | 7.838 |
| Bf | 66.055 | 66.055 | 66.055 |
| β | −.063 | −.121 | −.181 |
| D0 | 1729.447 | 1729.447 | 1729.447 |
| d2 | .864 | .864 | .864 |
| d5 | 15.906 | 15.906 | 15.906 |
| d7 | 2.669 | 41.124 | 53.943 |
| d12 | 38.983 | 19.710 | .438 |
| d15 | 20.567 | 1.384 | 7.838 |
| Bf | 66.055 | 66.055 | 66.055 |

TABLE 3

(Third Embodiment)

Part 1
Focal distance: f = 135 to 405
F number: FN = 5.6

| | r | d | ν | n | | |
|---|---|---|---|---|---|---|
| 1 | 148.000 | 10.00 | 82.6 | 1.49782 | G11 | |
| 2 | −1118.658 | (d2) | | | | |
| 3 | 119.000 | 4.00 | 46.4 (37.0) | 1.80411 | G12 | G1 |
| 4 | 78.644 | 10.00 | 82.6 (66.9) | 1.49782 | | |
| 5 | 1063.839 | (d5) | | | | |
| 6 | −1100.000 | 4.00 | 35.2 | 1.74950 | G13 | |
| 7 | 400.802 | (d7) | | | | |
| 8 | −1000.000 | 3.38 | 47.1 | 1.67003 | | |
| 9 | 61.167 | 8.00 | | | | |
| 10 | −68.000 | 3.38 | 53.8 | 1.69350 | G2 | |
| 11 | 79.000 | 4.72 | 23.0 | 1.86074 | | |
| 12 | −548.723 | (d13) | | | | |
| 13 | 187.000 | 6.00 | 70.1 | 1.51860 | G3 | |
| 14 | −47.000 | 3.78 | 33.9 | 1.80384 | | |
| 15 | −81.324 | (d15) | | | | |
| 16 | 64.700 | 6.75 | 82.6 | 1.49782 | | |
| 17 | −555.000 | 11.00 | | | | |
| 18 | −600.000 | 4.05 | 27.6 | 1.75520 | | |
| 19 | 343.422 | 55.35 | | | G4 | |
| 20 | 165.375 | 5.40 | 40.4 | 1.60717 | | |
| 21 | −659.505 | 5.80 | | | | |
| 22 | −44.500 | 4.05 | 70.2 | 1.48749 | | |
| 23 | −95.754 | (Bf) | | | | |

Part 2

| f | 135.000 | 270.000 | 405.001 |
|---|---|---|---|
| D0 | ∞ | ∞ | ∞ |
| d2 | 22.063 | 22.063 | 22.063 |
| d5 | 9.369 | 9.369 | 9.369 |
| d7 | 4.219 | 65.516 | 85.949 |
| d12 | 57.577 | 33.792 | 10.006 |
| d15 | 40.202 | 2.690 | 6.044 |
| Bf | 88.438 | 88.438 | 88.438 |
| β | −.053 | −.106 | −.160 |
| D0 | 2629.386 | 2629.386 | 2629.386 |
| d2 | 5.058 | 5.058 | 5.058 |
| d5 | 26.374 | 26.374 | 26.374 |
| d7 | 4.219 | 65.516 | 85.949 |
| d12 | 57.577 | 33.792 | 10.006 |
| d15 | 40.202 | 2.690 | 6.044 |
| Bf | 88.438 | 88.438 | 88.438 |

TABLE 4

(Fourth Embodiment)

Part 1
Focal distance: f = 100 to 300
F number: FN = 4.5

| | r | d | ν | n | | |
|---|---|---|---|---|---|---|
| 1 | 103.000 | 11.00 | 70.2 | 1.48749 | G11 | |
| 2 | −270.000 | 2.00 | 50.3 | 1.72000 | | |
| 3 | −582.514 | (d3) | | | | |
| 4 | 79.000 | 3.00 | 39.6 (31.1) | 1.80454 | G12 | G1 |
| 5 | 52.400 | 11.70 | 82.6 (66.9) | 1.49782 | | |
| 6 | 809.107 | (d6) | | | | |
| 7 | 5500.000 | 3.50 | 46.4 | 1.80411 | G13 | |
| 8 | 231.031 | (d8) | | | | |
| 9 | −807.000 | 2.50 | 50.8 | 1.65844 | | |
| 10 | 46.000 | 9.50 | | | | |
| 11 | −54.000 | 2.50 | 55.6 | 1.69680 | G2 | |
| 12 | 60.000 | 3.50 | 23.0 | 1.86074 | | |
| 13 | −1522.939 | (d13) | | | | |
| 14 | 145.000 | 5.80 | 70.1 | 1.51860 | G3 | |
| 15 | −35.600 | 2.80 | 33.9 | 1.80384 | | |
| 16 | −60.585 | (d16) | | | | |
| 17 | 52.400 | 5.00 | 82.6 | 1.49782 | | |
| 18 | −310.389 | 8.00 | | | | |
| 19 | −330.000 | 3.00 | 27.6 | 1.75520 | | |
| 20 | 409.882 | 44.00 | | | G4 | |
| 21 | 122.500 | 4.00 | 45.9 | 1.54814 | | |
| 22 | −257.720 | 4.30 | | | | |

TABLE 4-continued

(Fourth Embodiment)

| | | | | |
|---|---|---|---|---|
| 23 | −37.800 | 3.00 | 59.0 | 1.51823 |
| 24 | −95.302 | (Bf) | | |

Part 2

| f | 100.000 | 200.000 | 300.000 |
|---|---|---|---|
| D0 | ∞ | ∞ | ∞ |
| d3 | 12.789 | 12.789 | 12.789 |
| d6 | 1.576 | 1.576 | 1.576 |
| d8 | 4.191 | 44.170 | 57.496 |
| d13 | 42.079 | 23.541 | 5.003 |
| d16 | 24.134 | 2.694 | 7.905 |
| Bf | 64.600 | 64.600 | 64.600 |
| β | −.060 | −.121 | −.181 |
| D0 | 1721.569 | 1721.569 | 1721.569 |
| d3 | .778 | .778 | .778 |
| d6 | 13.587 | 13.587 | 13.587 |
| d8 | 4.191 | 44.170 | 57.496 |
| d13 | 42.079 | 23.541 | 5.003 |
| d16 | 24.134 | 2.694 | 7.905 |
| Bf | 64.600 | 64.600 | 64.600 |

TABLE 5

(Fifth Embodiment)

Part 1
Focal distance: f = 100 to 300
F number: FN = 4.5

| | r | d | ν | n | | |
|---|---|---|---|---|---|---|
| 1 | 94.000 | 3.00 | 39.6 | 1.80454 | | |
| 2 | 84.000 | 10.00 | 70.2 | 1.48749 | G11 | |
| 3 | 314396.582 | (d3) | | | | |
| 4 | 81.000 | 3.00 | 39.6 | 1.80454 | | |
| | | (31.0) | | | | |
| 5 | 53.400 | 11.70 | 82.6 | 1.49782 | G12 | G1 |
| | | (66.9) | | | | |
| 6 | 730.690 | (d6) | | | | |
| 7 | 11000.000 | 3.50 | 40.9 | 1.79631 | G13 | |
| 8 | 309.516 | (d8) | | | | |
| 9 | −550.000 | 2.50 | 50.8 | 1.65844 | | |
| 10 | 44.500 | 12.00 | | | | |
| 11 | −54.300 | 2.50 | 55.6 | 1.69680 | G2 | |
| 12 | 63.000 | 3.50 | 23.0 | 1.86074 | | |
| 13 | −519.766 | (d13) | | | | |
| 14 | 138.000 | 5.80 | 70.1 | 1.51860 | | |
| 15 | −35.100 | 2.80 | 33.9 | 1.80384 | G3 | |
| 16 | −60.258 | (d16) | | | | |
| 17 | 54.200 | 5.00 | 82.6 | 1.49782 | | |
| 18 | −236.034 | 8.00 | | | | |
| 19 | −520.000 | 3.00 | 27.6 | 1.75520 | | |
| 20 | 263.473 | 41.00 | | | | |
| 21 | 122.500 | 4.00 | 49.1 | 1.53172 | G4 | |
| 22 | −250.000 | 4.30 | | | | |
| 23 | −37.800 | 3.00 | 54.6 | 1.51454 | | |
| 24 | −94.365 | (Bf) | | | | |

Part 2

| f | 100.000 | 199.697 | 299.698 |
|---|---|---|---|
| D0 | ∞ | ∞ | ∞ |
| d3 | 10.623 | 10.623 | 10.623 |
| d6 | 2.777 | 2.777 | 2.777 |
| d8 | 2.794 | 41.249 | 54.068 |
| d13 | 38.650 | 19.378 | .106 |
| d16 | 20.583 | 1.400 | 7.854 |
| Bf | 65.761 | 65.761 | 65.761 |
| β | −.046 | −.093 | −.139 |
| D0 | 2230.211 | 2230.211 | 2230.211 |
| d3 | .378 | .378 | .378 |
| d6 | 13.022 | 13.022 | 13.022 |
| d8 | 2.794 | 41.249 | 54.068 |
| d13 | 38.650 | 19.378 | .106 |
| d16 | 65.761 | 65.761 | 65.761 |

TABLE 6

(Sixth Embodiment)

Part 1
Focal distance: f = 100 to 300
F number: FN = 4.5

| | r | d | ν | n | | |
|---|---|---|---|---|---|---|
| 1 | 99.500 | 8.50 | 70.2 | 1.48749 | G11 | |
| 2 | −7719.420 | (d2) | | | | |
| 3 | 78.000 | 3.00 | 33.9 | 1.80384 | | |
| | | (26.2) | | | | |
| 4 | 52.300 | 12.30 | 70.2 | 1.48749 | G12 | G1 |
| | | (57.6) | | | | |
| 5 | 731.524 | (d5) | | | | |
| 6 | 6200.000 | 3.00 | 35.2 | 1.74950 | G13 | |
| 7 | 279.087 | (d7) | | | | |
| 8 | −740.000 | 2.40 | 50.8 | 1.65844 | | |
| 9 | 43.700 | 11.60 | | | | |
| 10 | −53.000 | 2.40 | 55.6 | 1.69680 | G2 | |
| 11 | 51.500 | 3.40 | 25.4 | 1.80518 | | |
| 12 | −441.353 | (d12) | | | | |
| 13 | 134.000 | 5.80 | 70.1 | 1.51860 | | |
| 14 | −34.222 | 2.50 | 33.9 | 1.80384 | G3 | |
| 15 | −58.775 | (d15) | | | | |
| 16 | 47.400 | 4.80 | 70.2 | 1.48749 | | |
| 17 | −147.000 | 5.80 | | | | |
| 18 | −144.987 | 3.00 | 27.6 | 1.75520 | | |
| 19 | 1615.775 | 42.50 | | | | |
| 20 | 119.438 | 4.00 | 36.3 | 1.62004 | G4 | |
| 21 | −432.036 | 4.20 | | | | |
| 22 | −34.750 | 3.00 | 55.6 | 1.69680 | | |
| 23 | −75.912 | (Bf) | | | | |

Part 2

| f | 100.000 | 199.697 | 299.699 |
|---|---|---|---|
| D0 | ∞ | ∞ | ∞ |
| d2 | 14.321 | 14.321 | 14.321 |
| d5 | 2.003 | 2.003 | 2.003 |
| d7 | 2.582 | 40.076 | 52.574 |
| d12 | 38.097 | 19.307 | .516 |
| d15 | 19.984 | 1.280 | 7.573 |
| Bf | 59.832 | 59.832 | 59.832 |
| β | −.062 | −.214 | −.185 |
| D0 | 1686.211 | 1686.211 | 1686.211 |
| d2 | 1.436 | 1.436 | 1.436 |
| d5 | 14.888 | 14.888 | 14.888 |
| d7 | 2.582 | 40.076 | 52.574 |
| d12 | 38.097 | 19.307 | .516 |
| d15 | 19.984 | 1.280 | 7.573 |
| Bf | 59.832 | 59.832 | 59.832 |

TABLE 7

(Seventh Embodiment)

Part 1
Focal distance: f = 100 to 300
F number: FN = 4.5

| | r | d | ν | n | | |
|---|---|---|---|---|---|---|
| 1 | 100.000 | 9.00 | 82.6 | 1.49782 | G11 | |
| 2 | 3414.357 | (d2) | | | | |
| 3 | 81.200 | 3.00 | 39.6 | 1.80454 | | |
| | | (31.1) | | | | |
| 4 | 53.400 | 12.30 | 82.6 | 1.49782 | G12 | G1 |
| | | (66.9) | | | | |
| 5 | 758.500 | (d5) | | | | |
| 6 | 2200.000 | 3.00 | 40.9 | 1.79631 | G13 | |
| 7 | 278.071 | (d7) | | | | |
| 8 | −900.000 | 2.50 | 58.5 | 1.65160 | | |
| 9 | 40.000 | 3.50 | 50.8 | 1.65844 | | |
| 10 | 43.000 | 9.00 | | | | |
| 11 | −50.000 | 2.50 | 48.1 | 1.71700 | G2 | |
| 12 | 62.000 | 3.50 | 23.0 | 1.86074 | | |
| 13 | −299.563 | (d13) | | | | |
| 14 | 145.000 | 5.80 | 70.1 | 1.51860 | | |
| 15 | −35.400 | 2.80 | 33.9 | 1.80384 | G3 | |
| 16 | −59.773 | (d16) | | | | |

TABLE 7-continued
(Seventh Embodiment)

| | | | | |
|---|---|---|---|---|
| 17 | 50.700 | 5.53 | 70.2 | 1.48749 |
| 18 | 199.634 | .20 | | |
| 19 | 55.000 | 3.46 | 65.8 | 1.46450 |
| 20 | 342.000 | 1.00 | | |
| 21 | 142.000 | 2.20 | 25.5 | 1.80458 |
| 22 | 70.068 | 53.40 | | |
| 23 | −27.500 | 2.20 | 55.6 | 1.69680 |
| 24 | −61.535 | .20 | | |
| 25 | 120.000 | 4.50 | 40.8 | 1.58144 |
| 26 | −140.845 | (Bf) | | |

G4 brackets rows 17–26.

Part 2

| f | 100.000 | 199.697 | 299.699 |
|---|---|---|---|
| D0 | ∞ | ∞ | ∞ |
| d2 | 14.113 | 14.113 | 14.113 |
| d5 | 2.464 | 2.464 | 2.464 |
| d7 | 1.823 | 40.278 | 53.096 |
| d13 | 40.292 | 21.020 | 1.747 |
| d16 | 20.681 | 1.498 | 7.952 |
| Bf | 53.675 | 53.675 | 53.675 |
| β | −.060 | −.121 | −.181 |
| D0 | 1729.447 | 1729.447 | 1729.447 |
| d2 | .897 | .897 | .897 |
| d5 | 15.680 | 15.680 | 15.680 |
| d7 | 1.823 | 40.278 | 53.096 |
| d13 | 40.292 | 21.020 | 1.747 |
| d16 | 20.681 | 1.498 | 7.952 |
| Bf | 53.675 | 53.675 | 53.675 |

TABLE 8
(Eighth Embodiment)

Part 1
Focal distance: f = 100 to 300
F number: FN = 4.5

| | r | d | ν | n | | |
|---|---|---|---|---|---|---|
| 1 | 100.000 | 9.00 | 82.6 | 1.49782 | G11 | |
| 2 | 3414.357 | (d2) | | | | |
| 3 | 81.200 | 3.00 | 39.6 (31.1) | 1.80454 | | |
| 4 | 53.400 | 12.30 | 82.6 (66.9) | 1.49782 | G12 | G1 |
| 5 | 758.500 | (d5) | | | | |
| 6 | 2200.000 | 3.00 | 39.6 | 1.80454 | G13 | |
| 7 | 280.577 | (d7) | | | | |
| 8 | −900.000 | 3.00 | 47.1 | 1.67003 | | |
| 9 | −140.000 | 2.50 | 60.0 | 1.64000 | | |
| 10 | 43.000 | 9.00 | | | G2 | |
| 11 | −50.000 | 2.50 | 48.1 | 1.71700 | | |
| 12 | 63.000 | 3.50 | 23.0 | 1.86074 | | |
| 13 | −342.025 | (d13) | | | | |
| 14 | 145.000 | 5.80 | 70.1 | 1.51860 | | |
| 15 | −35.400 | 2.80 | 33.9 | 1.80384 | G3 | |
| 16 | −59.773 | (d16) | | | | |
| 17 | 51.200 | 5.53 | 70.2 | 1.48749 | | |
| 18 | 208.001 | .20 | | | | |
| 19 | 55.000 | 3.46 | 65.8 | 1.46450 | | |
| 20 | 342.000 | 1.00 | | | | |
| 21 | 138.000 | 2.20 | 25.5 | 1.80458 | G4 | |
| 22 | 69.059 | 53.40 | | | | |
| 23 | −27.500 | 2.20 | 57.6 | 1.67025 | | |
| 24 | −64.469 | .20 | | | | |
| 25 | 120.000 | 4.50 | 40.8 | 1.58144 | | |
| 26 | −141.568 | (Bf) | | | | |

Part 2

| f | 100.000 | 199.697 | 299.699 |
|---|---|---|---|
| D0 | ∞ | ∞ | ∞ |
| d2 | 14.113 | 14.113 | 14.113 |
| d5 | 2.471 | 2.471 | 2.471 |
| d7 | 1.932 | 40.388 | 53.206 |
| d13 | 40.516 | 21.244 | 1.972 |
| d16 | 20.681 | 1.498 | 7.952 |
| Bf | 53.597 | 53.597 | 53.597 |
| β | −.060 | −.121 | −.181 |
| D0 | 1729.447 | 1729.447 | 1729.447 |
| d2 | .897 | .897 | .897 |
| d5 | 15.686 | 15.686 | 15.686 |
| d7 | 1.932 | 40.388 | 53.206 |
| d13 | 40.516 | 21.244 | 1.972 |
| d16 | 20.681 | 1.498 | 7.952 |
| Bf | 53.597 | 53.597 | 53.597 |

TABLE 9
(Ninth Embodiment)

Part 1
Focal distance: f = 135 to 405
F number: FN = 5.6

| | r | d | ν | n | | |
|---|---|---|---|---|---|---|
| 1 | 142.000 | 10.00 | 82.6 | 1.49782 | G11 | |
| 2 | −1659.867 | (d2) | | | | |
| 3 | 130.000 | 4.00 | 40.9 (32.2) | 1.79631 | | |
| 4 | 80.000 | 10.00 | 70.1 (57.2) | 1.51860 | G12 | G1 |
| 5 | 716.103 | (d5) | | | | |
| 6 | −580.000 | 4.00 | 26.1 | 1.78470 | G13 | |
| 7 | 10405.545 | (d7) | | | | |
| 8 | −1000.000 | 3.38 | 47.1 | 1.67003 | | |
| 9 | 62.000 | 7.00 | | | | |
| 10 | −68.000 | 3.38 | 53.8 | 1.69350 | G2 | |
| 11 | 81.000 | 4.72 | 23.8 | 1.84666 | | |
| 13 | −451.201 | (d12) | | | | |
| 13 | 195.000 | 6.00 | 70.1 | 1.51860 | | |
| 14 | −47.000 | 3.78 | 33.9 | 1.80384 | G3 | |
| 15 | −83.885 | (d15) | | | | |
| 16 | 78.000 | 6.75 | 82.6 | 1.49782 | | |
| 17 | −455.675 | 12.50 | | | | |
| 18 | 260.000 | 4.05 | 27.6 | 1.75520 | | |
| 19 | 144.217 | 55.35 | | | G4 | |
| 20 | 165.375 | 5.40 | 40.4 | 1.60717 | | |
| 21 | −659.505 | 5.80 | | | | |
| 22 | −53.700 | 4.05 | 45.9 | 1.54814 | | |
| 23 | −106.553 | (Bf) | | | | |

Part 2

| f | 135.000 | 270.000 | 405.000 |
|---|---|---|---|
| D0 | ∞ | ∞ | ∞ |
| d2 | 25.913 | 25.913 | 25.913 |
| d5 | 9.167 | 9.167 | 9.167 |
| d7 | 7.800 | 58.166 | 74.955 |
| d12 | 60.780 | 30.750 | .720 |
| d15 | 33.903 | 13.567 | 26.808 |
| Bf | 84.553 | 84.553 | 84.553 |
| β | −.053 | −.107 | −.160 |
| D0 | 2628.553 | 2628.553 | 2628.553 |
| d2 | 3.907 | 3.907 | 3.907 |
| d5 | 31.173 | 31.173 | 31.173 |
| d7 | 7.800 | 58.166 | 74.955 |
| d12 | 60.780 | 30.750 | .720 |
| d15 | 33.903 | 13.567 | 26.808 |
| Bf | 84.553 | 84.553 | 84.553 |

TABLE 10
(Conditional Correspondence Numerical Table)

| Conditions | Embodiments | | | | |
|---|---|---|---|---|---|
| | 1 | 2 | 3 | 4 | 5 |
| f12/f1 | 1.480 | 1.723 | 1.664 | 1.572 | 1.723 |
| f13/f1 | −2.196 | −2.506 | −1.608 | −1.814 | −2.506 |
| f11/f12 | 0.934 | 0.752 | 0.650 | 0.756 | 0.752 |
| D/f1 | 0.074 | 0.088 | 0.091 | 0.077 | 0.067 |
| D/f12 | 0.050 | 0.051 | 0.054 | 0.049 | 0.039 |
| f11/f1 | 1.382 | 1.295 | 1.081 | 1.188 | 1.295 |
| q11 | 1.097 | 1.046 | 0.766 | 0.699 | 1.001 |
| q12 | 0.985 | 1.239 | 1.252 | 1.216 | 1.249 |
| q13 | −1.287 | −1.212 | −0.466 | −1.088 | −1.058 |
| Δνd | 48.7 | 43.0 | 36.2 | 43.0 | 43.0 |
| Δνg | 40.7 | 35.8 | 30.0 | 35.8 | 35.8 |

TABLE 10-continued (Conditional Correspondence Numerical Table)

| Conditions | Embodiments | | | | |
|---|---|---|---|---|---|
| f1/f2 | −4.119 | −4.146 | −4.508 | −4.295 | −4.146 |
| f13/f2 | 9.044 | 10.390 | 7.250 | 7.792 | 10.390 |
| | 6 | 7 | 8 | 9 | |
| f12/f1 | 1.723 | 1.723 | 1.723 | 2.260 | |
| f13/f1 | −2.506 | −2.506 | −2.506 | −3.161 | |
| f11/f12 | 0.752 | 0.752 | 0.752 | 0.527 | |
| D/f1 | 0.092 | 0.088 | 0.088 | 0.117 | |
| D/f12 | 0.053 | 0.051 | 0.051 | 0.052 | |
| f11/f1 | 1.295 | 1.295 | 1.295 | 1.189 | |
| q11 | 0.975 | 1.060 | 1.060 | 0.842 | |
| q12 | 1.239 | 1.240 | 1.240 | 1.444 | |
| q13 | −1.094 | −1.289 | −1.292 | 0.894 | |
| Δνd | 37.0 | 43.0 | 43.0 | 29.2 | |
| Δνg | 31.0 | 35.8 | 35.8 | 25.1 | |
| f1/f2 | −4.146 | −4.146 | −4.146 | −4.026 | |
| f13/f2 | 10.390 | 10.390 | 10.390 | 12.730 | |

In each of the embodiments given above, a variety of aberrations are well compensated from the wide angle end to the telephoto end. Further, the various aberrations from the infinity to the closest distance in all the variable power areas are compensated in an extremely good state.

As discussed above, the lens system is made compact by the novel internal focusing system, and quick focusing is also attainable. Besides, it is possible to achieve the zoom lens exhibiting the excellent image forming performance in which the various aberrations are extremely well compensated from the infinity to the closest distance in all the variable areas from the wide angle end to the telephoto end.

Incidentally, supposing that the 4-group-based zoom lens shown in the embodiments of the present invention is provided, an aperture diaphragm S1 in the optical system is fixedly disposed in front of the fourth lens group. Hence, the exit pupil position can be fixed. This is advantageous in terms of performing the photometric and auto-focusing operations on the side of the camera body.

In addition, the lenses closest to the object and to the image can be fixed, whereby an airtight structure can be easily taken. The structure exhibiting an excellent durability can be also provided.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A zoom lens of an internal focusing system, comprising:
   a positive focusing lens group positioned close to an object and incorporating a focusing function; and
   a zoom variable power optical system including a negative variable power lens group disposed towards an image of an object formed by the zoom lens and having such a variable power function as to be movable along an optical axis, characterized in that said focusing lens group includes, sequentially from an object, a first lens element having a positive refractive power, a second lens element having a positive refractive power and movable along an optical axis and a third lens element having a negative refractive power, and only said second lens element is moved along the optical axis of the zoom lens to change a synthetic focal distance of said focusing lens group, thus effecting focusing.

2. The zoom lens as set forth in claim 1, wherein said focusing lens group is constructed to satisfy the following conditions:

$$1 \leq f12/f1 \leq 5$$
$$-5 \leq f13/f1 \leq -1.6$$
$$0.3 \leq f11/f12 \leq 1$$

where
   f1: the synthetic focal distance of said focusing lens group in the infinity focusing state;
   f11: the focal distance of said first positive lens element in said focusing lens group;
   f12: the focal distance of said second positive lens element in said focusing lens group; and
   f13: the focal distance of said third negative lens element in said focusing lens group.

3. The zoom lens as set forth in claim 2, wherein said first positive lens element in said focusing lens group is constructed to satisfy the following conditions:

$$0.5 \leq f11/f1 \leq 1.4$$

where
   f1: the synthetic focal distance of said focusing lens group in the infinity focusing state; and
   f11: the focal distance of said first positive lens element in said focusing lens group.

4. The zoom lens as set forth in claim 2, wherein said focusing lens group is constructed to satisfy the following conditions:

$$0.75 \leq q11 \leq 2$$
$$0.9 \leq q12 \leq 3$$
$$-1.6 \leq q13 \leq 3$$

where q11, q12 and q13 are the shape factors of said first, second and third lens elements, and the shape factor qli is defined as follows:

$$qli = \frac{Rb + Ra}{Rb - Ra} \quad (i:1, 2, 3)$$

where Ra is the radius of curvature of the surface closest to the object among the surfaces constituting said respective lens elements, and Rb is the radius of curvature the surface closest to the image.

5. The zoom lens as set forth in claim 2, wherein said focusing lens group is constructed to further satisfy the following conditions:

$$0.75 \leq q11 \leq 1.1$$
$$0.9 \leq q12 \leq 1.5$$
$$-1.3 \leq q13 \leq 1$$

where q11, q12 and q13 are the shape factors of said first, second and third lens elements, and the shape factor qli is defined as follows:

$$qli = \frac{Rb + Ra}{Rb - Ra} \quad (i:1, 2, 3)$$

where Ra is the radius of curvature of the surface closest to the object among the surfaces constituting said respective lens elements, and Rb is the radius of curvature of the surface closest to the image.

6. The zoom lens as set forth in claim 2, wherein said second lens element is constructed to satisfy the following conditions:

$$20 \leq \Delta\gamma d \leq 70$$

$$20 \leq \Delta\gamma g \leq 60$$

where $\Delta\gamma d$ and $\Delta\gamma g$ are the differences with respect to the Abbe numbers $\gamma d$ and $\gamma g$ of respective lens glass materials of said second lens element, which includes at least a single piece of positive lens and a single piece of negative lens, and the Abbe numbers $\gamma d$ and $\gamma g$ are defined as follows:

$$vd = \frac{nd - 1}{nF - nc}, \quad vg = \frac{nd - 1}{ng - nd}$$

where
nd: the refractive index of the glass material associated with a d-line (587.6 nm);
nF: the refractive index of the glass material associated with an F-line (486.1 nm);
nc: the refractive index of the glass material associated with a c-line (656.3 nm); and
ng: the refractive index of the glass material associated with a g-line (435.8 nm).

7. The zoom lens as set forth in claim 2, wherein said second lens element is constructed to satisfy the following conditions:

$$30 \leq \Delta\gamma d \leq 50$$

$$25 \leq \Delta\gamma g \leq 41$$

where $\Delta\gamma d$ and $\Delta\gamma g$ are the differences with respect to the Abbe numbers $\gamma d$ and $\gamma g$ of respective lens glass materials of said second lens element, which includes at least a single piece of positive lens and a single piece of negative lens, and the Abbe numbers $\gamma d$ and $\gamma g$ are defined as follows:

$$vd = \frac{nd - 1}{nF - nc}, \quad vg = \frac{nd - 1}{ng - nd}$$

where
nd: the refractive index of the glass material associated with a d-line (587.6 nm);
nF: the refractive index of the glass material associated with an F-line (486.1 nm);
nc: the refractive index of the glass material associated with a c-line (656.3 nm); and
ng: the refractive index of the glass material associated with a g-line (435.8 nm).

8. The zoom lens as set forth in claim 2, wherein said focusing lens group and said variable power lens group are constructed to satisfy the following conditions:

$$-5.5 \leq f1/f2 \leq -4.0$$

where f2 is the focal distance of said variable power lens group.

9. The zoom lens as set forth in claim 2, wherein said third lens element and said variable power lens group are constructed to satisfy the following condition:

$$7 \leq f13/f2 \leq 20$$

where f2 is the focal distance of said variable power lens group.

10. The zoom lens as set forth in claim 2, wherein said focusing lens group and said variable power lens group are constructed to satisfy the following condition:

$$-4.3 \leq f1/f2 \leq -4.0$$

where f2 is the focal distance of said variable power lens group.

11. The zoom lens as set forth in claim 2, wherein said third lens element and said variable power lens group are constructed to satisfy the following condition:

$$7 \leq f13/f2 \leq 13$$

where f2 is the focal distance of said variable power lens group.

12. The zoom lens as set forth in claim 2, further comprising a positive image forming lens group disposed closer to the image than said zoom variable power optical system and incorporating an image forming function, said zoom variable power optical system further including an image surface position compensating lens group disposed between said variable lens group and said image forming lens group, movable along the optical axis and having positive refractive power, thus compensating fluctuations in the image surface position due to a movement of said variable power lens group.

13. The zoom lens as set forth in claim 2, wherein said focusing lens group is constructed to satisfy the following conditions:

$$0.65 \leq q11 \leq 3$$
$$0.9 \leq q12 \leq 3$$
$$-1.6 \leq q13 \leq 3$$

where q11, q12 and q13 are the shape factors of said first, second and third lens elements, and the shape factor q1i is defined as follows:

$$qli = \frac{Rb + Ra}{Rb - Ra} \quad (i:1, 2, 3)$$

where Ra is the radius of curvature of the surface closest to the object among the surfaces constituting said respective lens elements, and Rb is the radius of curvature the surface closest to the image.

14. The zoom lens as set forth in claim 2, wherein said first lens element in said focusing lens group is constituted by one of a single positive lens having a convex surface directed to the object and a joint lens having joined positive and negative lenses, said second lens element is constituted by a joint lens having a negative meniscus lens with a convex surface directed to the object and a positive lens joined to said negative meniscus and having a larger curvature convex surface directed to the object, and said third lens element is constituted by one of a single negative meniscus lens having a convex surface directed to the object, a single negative double-concave lens, and a negative joint lens having joined negative and positive meniscus lenses with respective convex surfaces directed to the object.

15. The zoom lens as set forth in claim 1, wherein said focusing lens group is constructed to satisfy the following conditions:

$$1.4 \leq f12/f1 \leq 2.3$$
$$-3.2 \leq f13/f1 \leq -1.6$$
$$0.5 \leq f11/f12 \leq 1$$

where
- f1: the synthetic focal distance of said focusing lens group in the infinity focusing state;
- f11: the focal distance of said first positive lens element in said focusing lens group;
- f12: the focal distance of said second positive lens element in said focusing lens group; and
- f13: the focal distance of said third negative lens element in said focusing lens group.

16. The zoom lens as set forth in claim 1, wherein said second lens element is constructed to satisfy the following conditions:

$$0.01 < D/f1 < 0.5$$

where D is the aerial spacing in the infinity focusing state between said first positive lens element in said focusing lens group and said second positive lens element, and f1 is the synthetic focal distance of said focusing lens group in the infinity focusing state.

17. The zoom lens as set forth in claim 1, wherein said second lens element is constructed to satisfy the following conditions:

$$0.01 < D/f12 < 0.3$$

where D is the aerial spacing in the infinity focusing state between said first positive lens element in said focusing lens group and said second positive lens element, and f12 is the focal distance of said second positive lens element in said focusing lens group.

18. The zoom lens as set forth in claim 1, wherein said second lens element in said focusing lens group is constructed to satisfy the following conditions:

$$0.03 < D/f1 < 0.15$$

$$0.03 < D/f12 < 0.07$$

where
- D: the aerial spacing between said first positive lens element and second lens element in said focusing lens group in the infinity focusing state;
- f1: the synthetic focal distance of said focusing lens group in the infinity focusing state; and
- f12: the focal distance of said second positive lens element in said focusing lens group.

19. The zoom lens as set forth in claim 1, wherein said zoom lens is constructed in accordance with the following data Table:

| | Focal distance: f = 100 to 300 F number: FN = 4.5 | | | | | |
|---|---|---|---|---|---|---|
| | r | d | ν | n | | |
| 1 | 104.200 | 9.00 | 82.6 | 1.49782 | G11 | |
| 2 | 2254.650 | (d2) | | | | |
| 3 | 79.900 | 3.00 | 33.9 (26.2) | 1.80384 | G12 | G1 |
| 4 | 51.500 | 14.30 | 82.6 (66.9) | 1.49782 | | |
| 5 | −10499.426 | (d5) | | | | |
| 6 | 1900.000 | 3.00 | 52.3 | 1.74810 | G13 | |
| 7 | 146.000 | 3.20 | 30.1 | 1.69895 | | |
| 8 | 238.479 | (d8) | | | | |
| 9 | −600.000 | 2.50 | 58.5 | 1.65160 | | |
| 10 | 46.300 | 9.00 | | | | |
| 11 | −54.999 | 2.50 | 53.8 | 1.69350 | G2 | |
| 12 | 58.147 | 3.50 | 23.0 | 1.86074 | | |
| 13 | −6531.374 | (d13) | | | | |
| 14 | 130.000 | 6.00 | 70.1 | 1.51860 | G3 | |
| 15 | −35.300 | 2.80 | 33.9 | 1.80384 | | |
| 16 | −61.483 | (d16) | | | | |
| 17 | 52.850 | 5.00 | 82.6 | 1.49782 | | |
| 18 | −325.650 | 9.00 | | | | |
| 19 | −710.000 | 3.00 | 25.4 | 1.80518 | | |
| 20 | 286.699 | 40.00 | | | G4 | |
| 21 | 137.000 | 4.00 | 45.9 | 1.54814 | | |
| 22 | −218.675 | 4.30 | | | | |
| 23 | −36.400 | 3.00 | 60.3 | 1.51835 | | |
| 24 | −82.412 | (Bf) | | | | |

| f | 100.000 | 200.000 | 300.004 |
|---|---|---|---|
| D0 | ∞ | ∞ | ∞ |
| d2 | 11.777 | 11.777 | 11.777 |
| d5 | 1.276 | 1.276 | 1.276 |
| d8 | 2.856 | 41.059 | 53.794 |
| d13 | 39.978 | 20.579 | 1.179 |
| d16 | 21.067 | 2.263 | 8.928 |
| Bf | 65.811 | 65.811 | 65.811 |
| β | −.060 | −.126 | −.181 |
| D0 | 1730.354 | 1730.354 | 1730.354 |
| d2 | .626 | .626 | .626 |
| d5 | 12.426 | 12.426 | 12.426 |
| d8 | 2.856 | 41.059 | 53.794 |
| d13 | 39.978 | 20.579 | 1.179 |
| d16 | 21.067 | 2.263 | 8.928 |
| Bf | 65.811 | 65.811 | 65.811 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

20. The zoom lens as set forth in claim 1, wherein said zoom lens is constructed in accordance with the following data Table:

| | Focal distance: f = 100 to 300 F number: FN = 4.5 | | | | | |
|---|---|---|---|---|---|---|
| | r | d | ν | n | | |
| 1 | 100.700 | 9.00 | 82.6 | 1.49782 | G11 | |
| 2 | 4521.274 | (d2) | | | | |
| 3 | 81.200 | 3.00 | 39.6 (31.1) | 1.80454 | G12 | G1 |
| 4 | 53.400 | 11.70 | 82.6 (66.9) | 1.49782 | | |
| 5 | 759.864 | (d5) | | | | |
| 6 | 3000.000 | 3.50 | 40.9 | 1.79631 | G13 | |
| 7 | 287.802 | (d7) | | | | |
| 8 | −807.000 | 2.50 | 50.8 | 1.65844 | | |
| 9 | 44.760 | 12.00 | | | | |
| 10 | −54.300 | 2.50 | 55.6 | 1.69680 | G2 | |
| 11 | 62.000 | 3.50 | 23.0 | 1.86074 | | |
| 12 | −712.817 | (d12) | | | | |
| 13 | 137.000 | 5.80 | 70.1 | 1.51860 | G3 | |
| 14 | −35.100 | 2.80 | 33.9 | 1.80384 | | |
| 15 | −60.378 | (d15) | | | | |
| 16 | 53.700 | 5.00 | 82.6 | 1.49782 | | |

-continued

| | | | | | |
|---|---|---|---|---|---|
| 17 | −281.245 | 8.00 | | | |
| 18 | −872.000 | 3.00 | 27.6 | 1.75520 | |
| 19 | 236.257 | 41.00 | | | G4 |
| 20 | 122.500 | 4.00 | 49.1 | 1.53172 | |
| 21 | −250.000 | 4.30 | | | |
| 22 | −37.700 | 3.00 | 54.6 | 1.51454 | |
| 23 | −92.967 | (Bf) | | | |

| f | 100.000 | 199.697 | 299.698 |
|---|---|---|---|
| D0 | ∞ | ∞ | ∞ |
| d2 | 14.080 | 14.080 | 14.080 |
| d5 | 2.690 | 2.690 | 2.690 |
| d7 | 2.669 | 41.124 | 53.943 |
| d12 | 38.983 | 19.710 | .438 |
| d15 | 20.567 | 1.384 | 7.838 |
| Bf | 66.055 | 66.055 | 66.055 |
| β | −.063 | −.121 | −.181 |
| D0 | 1729.447 | 1729.447 | 1729.447 |
| d2 | .864 | .864 | .864 |
| d5 | 15.906 | 15.906 | 15.906 |
| d7 | 2.669 | 41.124 | 53.943 |
| d12 | 38.983 | 19.710 | .438 |
| d15 | 20.567 | 1.384 | 7.838 |
| Bf | 66.055 | 66.055 | 66.055 | where, in said Table, the leftmost numerals indicate the lens surface order from the object, r is the radius of curvature, d denotes the lens surface intervals, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

21. The zoom lens as set forth in claim 1, wherein said zoom lens is constructed in accordance with the following data Table:

Focal distance: f = 135 to 405
F number: FN = 5.6

| | r | d | ν | n | | |
|---|---|---|---|---|---|---|
| 1 | 148.000 | 10.00 | 82.6 | 1.49782 | G11 | |
| 2 | −1118.658 | (d2) | | | | |
| 3 | 119.000 | 4.00 | 46.4 (37.0) | 1.80411 | G12 | G1 |
| 4 | 78.644 | 10.00 | 82.6 (66.9) | 1.49782 | | |
| 5 | 1063.839 | (d5) | | | | |
| 6 | −1100.000 | 4.00 | 35.2 | 1.74950 | G13 | |
| 7 | 400.802 | (d7) | | | | |
| 8 | −1000.000 | 3.38 | 47.1 | 1.67003 | | |
| 9 | 61.167 | 8.00 | | | | |
| 10 | −68.000 | 3.38 | 53.8 | 1.69350 | G2 | |
| 11 | 79.000 | 4.72 | 23.0 | 1.86074 | | |
| 12 | −548.723 | (d13) | | | | |
| 13 | 187.000 | 6.00 | 70.1 | 1.51860 | | |
| 14 | −47.000 | 3.78 | 33.9 | 1.80384 | G3 | |
| 15 | −81.324 | (d15) | | | | |
| 16 | 64.700 | 6.75 | 82.6 | 1.49782 | | |
| 17 | −555.000 | 11.00 | | | | |
| 18 | −600.000 | 4.05 | 27.6 | 1.75520 | | |
| 19 | 343.422 | 55.35 | | | | |
| 20 | 165.375 | 5.40 | 40.4 | 1.60717 | G4 | |
| 21 | −659.505 | 5.80 | | | | |
| 22 | −44.500 | 4.05 | 70.2 | 1.48749 | | |
| 23 | −95.754 | (Bf) | | | | |

| f | 135.000 | 270.000 | 405.001 |
|---|---|---|---|
| D0 | ∞ | ∞ | ∞ |
| d2 | 22.063 | 22.063 | 22.063 |
| d5 | 9.369 | 9.369 | 9.369 |
| d7 | 4.219 | 65.516 | 85.949 |
| d12 | 57.577 | 33.792 | 10.006 |
| d15 | 40.202 | 2.690 | 6.044 |
| Bf | 88.438 | 88.438 | 88.438 |
| β | −.053 | −.106 | −.160 |
| D0 | 2629.386 | 2629.386 | 2629.386 |
| d2 | 5.058 | 5.058 | 5.058 |
| d5 | 26.374 | 26.374 | 26.374 |
| d7 | 4.219 | 65.516 | 85.949 |
| d12 | 57.577 | 33.792 | 10.006 |
| d15 | 40.202 | 2.690 | 6.044 |
| Bf | 88.438 | 88.438 | 88.438 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

22. The zoom lens as set forth in claim 1, wherein said zoom lens is constructed in accordance with the following data Table:

Focal distance: f = 100 to 300
F number: FN = 4.5

| | r | d | ν | n | | |
|---|---|---|---|---|---|---|
| 1 | 103.000 | 11.00 | 70.2 | 1.48749 | | |
| 2 | −270.000 | 2.00 | 50.3 | 1.72000 | G11 | |
| 3 | −582.514 | (d3) | | | | |
| 4 | 79.000 | 3.00 | 39.6 (31.1) | 1.80454 | | |
| 5 | 52.400 | 11.70 | 82.6 (66.9) | 1.49782 | G12 | G1 |
| 6 | 809.107 | (d6) | | | | |
| 7 | 5500.000 | 3.50 | 46.4 | 1.80411 | G13 | |
| 8 | 231.031 | (d8) | | | | |
| 9 | −807.000 | 2.50 | 50.8 | 1.65844 | | |
| 10 | 46.000 | 9.50 | | | | |
| 11 | −54.000 | 2.50 | 55.6 | 1.69680 | G2 | |
| 12 | 60.000 | 3.50 | 23.0 | 1.86074 | | |
| 13 | −1522.939 | (d13) | | | | |
| 14 | 145.000 | 5.80 | 70.1 | 1.51860 | | |
| 15 | −35.600 | 2.80 | 33.9 | 1.80384 | G3 | |
| 16 | −60.585 | (d16) | | | | |
| 17 | 52.400 | 5.00 | 82.6 | 1.49782 | | |
| 18 | −310.389 | 8.00 | | | | |
| 19 | −330.000 | 3.00 | 27.6 | 1.75520 | | |
| 20 | 409.882 | 44.00 | | | G4 | |
| 21 | 122.500 | 4.00 | 45.9 | 1.54814 | | |
| 22 | −257.720 | 4.30 | | | | |
| 23 | −37.800 | 3.00 | 59.0 | 1.51823 | | |
| 24 | −95.302 | (Bf) | | | | |

| f | 100.000 | 200.000 | 300.000 |
|---|---|---|---|
| D0 | ∞ | ∞ | ∞ |
| d3 | 12.789 | 12.789 | 12.789 |
| d6 | 1.576 | 1.576 | 1.576 |
| d8 | 4.191 | 44.170 | 57.496 |
| d13 | 42.079 | 23.541 | 5.003 |
| d16 | 24.134 | 2.694 | 7.905 |
| Bf | 64.600 | 64.600 | 64.600 |
| β | −.060 | −.121 | −.181 |
| D0 | 1721.569 | 1721.569 | 1721.569 |
| d3 | .778 | .778 | .778 |
| d6 | 13.587 | 13.587 | 13.587 |
| d8 | 4.191 | 44.170 | 57.496 |
| d13 | 42.079 | 23.541 | 5.003 |
| d16 | 24.134 | 2.694 | 7.905 |
| Bf | 64.600 | 64.600 | 64.600 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

23. The zoom lens as set forth in claim 1, wherein said zoom lens is constructed in accordance with the following data Table:

| Focal distance: f = 100 to 300 F number: FN = 4.5 | | | | | | |
|---|---|---|---|---|---|---|
| | r | d | ν | n | | |
| 1 | 94.000 | 3.00 | 39.6 | 1.80454 | G11 | |
| 2 | 84.000 | 10.00 | 70.2 | 1.48749 | | |
| 3 | 314396.582 | (d3) | | | | |
| 4 | 81.000 | 3.00 | 39.6 (31.0) | 1.80454 | G12 | G1 |
| 5 | 53.400 | 11.70 | 82.6 (66.9) | 1.49782 | | |
| 6 | 730.690 | (d6) | | | | |
| 7 | 11000.000 | 3.50 | 40.9 | 1.79631 | G13 | |
| 8 | 309.516 | (d8) | | | | |
| 9 | −550.000 | 2.50 | 50.8 | 1.65844 | | |
| 10 | 44.500 | 12.00 | | | | |
| 11 | −54.300 | 2.50 | 55.6 | 1.69680 | G2 | |
| 12 | 63.000 | 3.50 | 23.0 | 1.86074 | | |
| 13 | −519.766 | (d13) | | | | |
| 14 | 138.000 | 5.80 | 70.1 | 1.51860 | G3 | |
| 15 | −35.100 | 2.80 | 33.9 | 1.80384 | | |
| 16 | −60.258 | (d16) | | | | |
| 17 | 54.200 | 5.00 | 82.6 | 1.49782 | | |
| 18 | −236.034 | 8.00 | | | | |
| 19 | −520.000 | 3.00 | 27.6 | 1.75520 | | |
| 20 | 263.473 | 41.00 | | | G4 | |
| 21 | 122.500 | 4.00 | 49.1 | 1.53172 | | |
| 22 | −250.000 | 4.30 | | | | |
| 23 | −37.800 | 3.00 | 54.6 | 1.51454 | | |
| 24 | −94.365 | (Bf) | | | | |

| f | 100.000 | 199.697 | 299.698 |
|---|---|---|---|
| D0 | ∞ | ∞ | ∞ |
| d3 | 10.623 | 10.623 | 10.623 |
| d6 | 2.777 | 2.777 | 2.777 |
| d8 | 2.794 | 41.249 | 54.068 |
| d13 | 38.650 | 19.378 | .106 |
| d16 | 20.583 | 1.400 | 7.854 |
| Bf | 65.761 | 65.761 | 65.761 |
| β | −.046 | −.093 | −.139 |
| D0 | 2230.211 | 2230.211 | 2230.211 |
| d3 | .378 | .378 | .378 |
| d6 | 13.022 | 13.022 | 13.022 |
| d8 | 2.794 | 41.249 | 54.068 |
| d13 | 38.650 | 19.378 | .106 |
| d16 | 20.583 | 1.400 | 7.854 |
| Bf | 65.761 | 65.761 | 65.761 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

24. The zoom lens as set forth in claim 1, wherein said zoom lens is constructed in accordance with the following data Table:

| Focal distance: f = 100 to 300 F number: FN = 4.5 | | | | | | |
|---|---|---|---|---|---|---|
| | r | d | ν | n | | |
| 1 | 99.500 | 8.50 | 70.2 | 1.48749 | G11 | |
| 2 | −7719.420 | (d2) | | | | |
| 3 | 78.000 | 3.00 | 33.9 (26.2) | 1.80384 | G12 | G1 |
| 4 | 52.300 | 12.30 | 70.2 (57.6) | 1.48749 | | |
| 5 | 731.524 | (d5) | | | | |
| 6 | 6200.000 | 3.00 | 35.2 | 1.74950 | G13 | |
| 7 | 279.087 | (d7) | | | | |
| 8 | −740.000 | 2.40 | 50.8 | 1.65844 | | |
| 9 | 43.700 | 11.60 | | | | |
| 10 | −53.000 | 2.40 | 55.6 | 1.69680 | G2 | |
| 11 | 51.500 | 3.40 | 25.4 | 1.80518 | | |
| 12 | −441.353 | (d12) | | | | |
| 13 | 134.000 | 5.80 | 70.1 | 1.51860 | G3 | |
| 14 | −34.222 | 2.50 | 33.9 | 1.80384 | | |
| 15 | −58.775 | (d15) | | | | |
| 16 | 47.400 | 4.80 | 70.2 | 1.48749 | | |
| 17 | −147.000 | 5.80 | | | | |
| 18 | −144.987 | 3.00 | 27.6 | 1.75520 | | |
| 19 | 1615.775 | 42.50 | | | G4 | |
| 20 | 119.438 | 4.00 | 36.3 | 1.62004 | | |
| 21 | −432.036 | 4.20 | | | | |
| 22 | −34.750 | 3.00 | 55.6 | 1.69680 | | |
| 23 | −75.912 | (Bf) | | | | |

| f | 100.000 | 199.697 | 299.699 |
|---|---|---|---|
| D0 | ∞ | ∞ | ∞ |
| d2 | 14.321 | 14.321 | 14.321 |
| d5 | 2.003 | 2.003 | 2.003 |
| d7 | 2.582 | 40.076 | 52.574 |
| d12 | 38.097 | 19.307 | .516 |
| d15 | 19.984 | 1.280 | 7.573 |
| Bf | 59.832 | 59.832 | 59.832 |
| β | −.062 | −.214 | −.185 |
| D0 | 1686.211 | 1686.211 | 1686.211 |
| d2 | 1.436 | 1.436 | 1.436 |
| d5 | 14.888 | 14.888 | 14.888 |
| d7 | 2.582 | 40.076 | 52.574 |
| d12 | 38.097 | 19.307 | .516 |
| d15 | 19.984 | 1.280 | 7.573 |
| Bf | 59.832 | 59.832 | 59.832 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens and β is the close distance photographing magnification.

25. The zoom lens as set forth in claim 1, wherein said zoom lens is constructed in accordance with the following data Table:

| Focal distance: f = 100 to 300 F number: FN = 4.5 | | | | | | |
|---|---|---|---|---|---|---|
| | r | d | ν | n | | |
| 1 | 100.000 | 9.00 | 82.6 | 1.49782 | G11 | |
| 2 | 3414.357 | (d2) | | | | |
| 3 | 81.200 | 3.00 | 39.6 (31.1) | 1.80454 | G12 | G1 |
| 4 | 53.400 | 12.30 | 82.6 (66.9) | 1.49782 | | |
| 5 | 758.500 | (d5) | | | | |
| 6 | 2200.000 | 3.00 | 40.9 | 1.79631 | G13 | |

-continued

| | | | | | |
|---|---|---|---|---|---|
| 7 | 278.071 | (d7) | | | |
| 8 | −900.000 | 2.50 | 58.5 | 1.65160 | |
| 9 | 40.000 | 3.50 | 50.8 | 1.65844 | |
| 10 | 43.000 | 9.00 | | | |
| 11 | −50.000 | 2.50 | 48.1 | 1.71700 | G2 |
| 12 | 62.000 | 3.50 | 23.0 | 1.86074 | |
| 13 | −299.563 | (d13) | | | |
| 14 | 145.000 | 5.80 | 70.1 | 1.51860 | |
| 15 | −35.400 | 2.80 | 33.9 | 1.80384 | G3 |
| 16 | −59.773 | (d16) | | | |
| 17 | 50.700 | 5.53 | 70.2 | 1.48749 | |
| 18 | 199.634 | .20 | | | |
| 19 | 55.000 | 3.46 | 65.8 | 1.46450 | |
| 20 | 342.000 | 1.00 | | | |
| 21 | 142.000 | 2.20 | 25.5 | 1.80458 | G4 |
| 22 | 70.068 | 53.40 | | | |
| 23 | −27.500 | 2.20 | 55.6 | 1.69680 | |
| 24 | −61.535 | .20 | | | |
| 25 | 120.000 | 4.50 | 40.8 | 1.58144 | |
| 26 | −140.845 | (Bf) | | | |

| f | 100.000 | 199.697 | 299.699 |
|---|---|---|---|
| D0 | ∞ | ∞ | ∞ |
| d2 | 14.113 | 14.113 | 14.113 |
| d5 | 2.464 | 2.464 | 2.464 |
| d7 | 1.823 | 40.278 | 53.096 |
| d13 | 40.292 | 21.020 | 1.747 |
| d16 | 20.681 | 1.498 | 7.952 |
| Bf | 53.675 | 53.675 | 53.675 |
| β | −.060 | −.121 | −.181 |
| D0 | 1729.447 | 1729.447 | 1729.447 |
| d2 | .897 | .897 | .897 |
| d5 | 15.680 | 15.680 | 15.680 |
| d7 | 1.823 | 40.278 | 53.096 |
| d13 | 40.292 | 21.020 | 1.747 |
| d16 | 20.681 | 1.498 | 7.952 |
| Bf | 53.675 | 53.675 | 53.675 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

26. The zoom lens as set forth in claim 1, wherein said zoom lens is constructed in accordance with the following data Table:

| | Focal distance: f = 100 to 300 F number: FN = 4.5 | | | | | |
|---|---|---|---|---|---|---|
| | r | d | ν | n | | |
| 1 | 100.000 | 9.00 | 82.6 | 1.49782 | G11 | |
| 2 | 3414.357 | (d2) | | | | |
| 3 | 81.200 | 3.00 | 39.6 (31.1) | 1.80454 | | |
| 4 | 53.400 | 12.30 | 82.6 (66.9) | 1.49782 | G12 | G1 |
| 5 | 758.500 | (d5) | | | | |
| 6 | 2200.000 | 3.00 | 39.6 | 1.80454 | G13 | |
| 7 | 280.577 | (d7) | | | | |
| 8 | −900.000 | 3.00 | 47.1 | 1.67003 | | |
| 9 | −140.000 | 2.50 | 60.0 | 1.64000 | | |
| 10 | 43.000 | 9.00 | | | G2 | |
| 11 | −50.000 | 2.50 | 48.1 | 1.71700 | | |
| 12 | 63.000 | 3.50 | 23.0 | 1.86074 | | |
| 13 | −342.025 | (d13) | | | | |
| 14 | 145.000 | 5.80 | 70.1 | 1.51860 | | |
| 15 | −35.400 | 2.80 | 33.9 | 1.80384 | G3 | |
| 16 | −59.773 | (d16) | | | | |
| 17 | 51.200 | 5.53 | 70.2 | 1.48749 | | |

-continued

| | | | | | |
|---|---|---|---|---|---|
| 18 | 208.001 | .20 | | | |
| 19 | 55.000 | 3.46 | 65.8 | 1.46450 | |
| 20 | 342.000 | 1.00 | | | |
| 21 | 138.000 | 2.20 | 25.5 | 1.80458 | G4 |
| 22 | 69.059 | 53.40 | | | |
| 23 | −27.500 | 2.20 | 57.6 | 1.67025 | |
| 24 | −64.469 | .20 | | | |
| 25 | 120.000 | 4.50 | 40.8 | 1.58144 | |
| 26 | −141.568 | (Bf) | | | |

| f | 100.000 | 199.697 | 299.699 |
|---|---|---|---|
| D0 | ∞ | ∞ | ∞ |
| d2 | 14.113 | 14.113 | 14.113 |
| d5 | 2.471 | 2.471 | 2.471 |
| d7 | 1.932 | 40.388 | 53.206 |
| d13 | 40.516 | 21.244 | 1.972 |
| d16 | 20.681 | 1.498 | 7.952 |
| Bf | 53.597 | 53.597 | 53.597 |
| β | −.060 | −.121 | −.181 |
| D0 | 1729.447 | 1729.447 | 1729.447 |
| d2 | .897 | .897 | .897 |
| d5 | 15.686 | 15.686 | 15.686 |
| d7 | 1.932 | 40.388 | 53.206 |
| d13 | 40.516 | 21.244 | 1.972 |
| d16 | 20.681 | 1.498 | 7.952 |
| Bf | 53.597 | 53.597 | 53.597 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

27. The zoom lens as set forth in claim 1, wherein said zoom lens is constructed in accordance with the following data Table:

| | Focal distance: f = 135 to 405, F number: FN = 5.6 | | | | | |
|---|---|---|---|---|---|---|
| | r | d | ν | n | | |
| 1 | 142.000 | 10.00 | 82.6 | 1.49782 | G11 | |
| 2 | −1659.867 | (d2) | | | | |
| 3 | 130.000 | 4.00 | 40.9 (32.2) | 1.79631 | | |
| 4 | 80.000 | 10.00 | 70.1 (57.2) | 1.51860 | G12 | G1 |
| 5 | 716.103 | (d5) | | | | |
| 6 | −580.000 | 4.00 | 26.1 | 1.78470 | G13 | |
| 7 | 10405.545 | (d7) | | | | |
| 8 | −1000.000 | 3.38 | 47.1 | 1.67003 | | |
| 9 | 62.000 | 7.00 | | | | |
| 10 | −68.000 | 3.38 | 53.8 | 1.69350 | G2 | |
| 11 | 81.000 | 4.72 | 23.8 | 1.84666 | | |
| 12 | −451.201 | (d12) | | | | |
| 13 | 195.000 | 6.00 | 70.1 | 1.51860 | | |
| 14 | −47.000 | 3.78 | 33.9 | 1.80384 | G3 | |
| 15 | −83.885 | (d15) | | | | |
| 16 | 78.000 | 6.75 | 82.6 | 1.49782 | | |
| 17 | −455.675 | 12.50 | | | | |
| 18 | 260.000 | 4.05 | 27.6 | 1.75520 | | |
| 19 | 144.217 | 55.35 | | | | |
| 20 | 165.375 | 5.40 | 40.4 | 1.60717 | G4 | |
| 21 | −659.505 | 5.80 | | | | |
| 22 | −53.700 | 4.05 | 45.9 | 1.54814 | | |
| 23 | −106.553 | (Bf) | | | | |

| f | 135.000 | 270.000 | 405.000 |
|---|---|---|---|
| D0 | ∞ | ∞ | ∞ |
| d2 | 25.913 | 25.913 | 25.913 |
| d5 | 9.167 | 9.167 | 9.167 |

-continued

|  |  |  |  |
|---|---|---|---|
| d7 | 7.800 | 58.166 | 74.955 |
| d12 | 60.780 | 30.750 | .720 |
| d15 | 33.903 | 13.567 | 26.808 |
| Bf | 84.553 | 84.553 | 84.553 |
| β | −.053 | −.107 | −.160 |
| D0 | 2628.553 | 2628.553 | 2628.553 |
| d2 | 3.907 | 3.907 | 3.907 |
| d5 | 31.173 | 31.173 | 31.173 |
| d7 | 7.800 | 58.166 | 74.955 |
| d12 | 60.780 | 30.750 | .720 |
| d15 | 33.903 | 13.567 | 26.808 |
| Bf | 84.553 | 84.553 | 84.553 | where, in said Table, the leftmost numerals indicate the lens surface order from the object, r is the radius of curvature, d denotes the lens surface interval, γ is the Abbe number (γd), the numeral within the parentheses under the Abbe number γ is the Abbe number γg, n is the refractive index in the d-line (λ=587.6 nm), f is the focal distance of the whole system, FN is the F number, D0 is the distance from the object to be photographed to the first surface of the lens, and β is the close distance photographing magnification.

28. The zoom lens as set forth in claim 1, wherein said focusing lens group is constructed to satisfy the following conditions:

$$1 \leq f12/f1 \leq 5$$
$$-5 \leq f13/f1 \leq -1.6$$
$$0.3 \leq f11/f12 \leq 1$$

where
f1: the synthetic focal distance of said focusing lens group in the infinity focusing state:
f11: the focal distance of said first positive lens element in said focusing lens group;
f12: the focal distance of said second positive lens element in said focusing lens group; and
f13: the focal distance of said third negative lens element in said focusing lens group,
and wherein said second lens element is constructed to satisfy the following condition:

$$0.01 < D/f1 < 0.5$$

where D is the aerial spacing in the infinity focusing state between said first positive lens element in said focusing lens group and said second positive lens element.

29. The zoom lens as set forth in claim 28, wherein said second lens element is constructed to satisfy the following condition:

$$0.01 < D/f12 < 0.3.$$

30. The zoom lens as set forth in claim 29, wherein said first positive lens element in said focusing lens group is constructed to satisfy the following condition:

$$0.5 \leq f11/f1 \leq 1.4.$$

31. The zoom lens as set forth in claim 30, wherein said focusing lens group and said variable power lens group are constructed to satisfy the following condition:

$$-5.5 \leq f1/f2 \leq -4.0$$

where f2 is the focal distance of said variable power lens group.

32. The zoom lens as set forth in claim 31, wherein said third lens element and said variable power lens group are constructed to satisfy the following condition:

$$7 \leq f13/f2 \leq 20.$$

33. The zoom lens as set forth in claim 32, further comprising a positive image forming lens group disposed closer to the image than said zoom variable power optical system and incorporating an image forming function, said zoom variable power optical system further including an image surface position compensating lens group disposed between said variable lens group and said image forming lens group, movable along the optical axis and having positive refractive power, thus compensating fluctuations in the image surface position due to a movement of said variable power lens group.

34. The zoom lens as set forth in claim 33, wherein said focusing lens group is constructed to satisfy the following conditions:

$$0.75 \leq q11 \leq 2$$
$$0.9 \leq q12 \leq 3$$
$$-1.6 \leq q13 \leq 3$$

where q11, q12 and q13 are the shape factors of said first, second and third lens elements, and the shape factor q1i is defined as follows:

$$qli = \frac{Rb + Ra}{Rb - Ra} \quad (i:1, 2, 3)$$

where Ra is the radius of curvature of the surface closest to the object among the surfaces constituting said respective lens elements, and Rb is the radius of curvature the surface closest to the image.

35. The zoom lens as set forth in claim 34, wherein said first lens element in said focusing lens group is constituted by one of a single positive lens having a convex surface directed to the object and a joint lens having joined positive and negative lenses, said second lens element is constituted by a joint lens having a negative meniscus lens with a convex surface directed to the object and a positive lens joined to said negative meniscus and having a larger curvature convex surface directed to the object, and said third lens element is constituted by one of a single negative meniscus lens having a convex surface directed to the object, a single negative double-concave lens, and a negative joint lens having joined negative and positive meniscus lenses with respective convex surfaces directed to the object.

* * * * *